(12) United States Patent
Hirabayashi et al.

(10) Patent No.: US 10,070,034 B2
(45) Date of Patent: Sep. 4, 2018

(54) IMAGE CAPTURING DEVICE, IMAGE CAPTURING METHOD, AND INFORMATION DISTRIBUTION SYSTEM

(71) Applicant: SONY CORPORATION, Tokyo (JP)

(72) Inventors: Takayuki Hirabayashi, Tokyo (JP); Yoichiro Sako, Tokyo (JP); Masakazu Yajima, Chiba (JP); Kouichiro Ono, Tokyo (JP); Masashi Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/369,977

(22) Filed: Dec. 6, 2016

(65) Prior Publication Data

US 2017/0085773 A1 Mar. 23, 2017

Related U.S. Application Data

(63) Continuation of application No. 14/458,792, filed on Aug. 13, 2014, now Pat. No. 9,535,248.

(30) Foreign Application Priority Data

Aug. 23, 2013 (JP) ................................. 2013-173398

(51) Int. Cl.
*G02B 27/14* (2006.01)
*H04N 5/232* (2006.01)
(Continued)

(52) U.S. Cl.
CPC ..... *H04N 5/23203* (2013.01); *G02B 27/0093* (2013.01); *G02B 27/01* (2013.01);
(Continued)

(58) Field of Classification Search
CPC combination set(s) only.
See application file for complete search history.

(56) References Cited

U.S. PATENT DOCUMENTS

| 8,374,779 B2 * | 2/2013 | Abe | G09B 29/10 340/815.4 |
| 2007/0159317 A1 * | 7/2007 | Nagata | B60R 1/00 340/461 |

(Continued)

FOREIGN PATENT DOCUMENTS

| CN | 101930125 A | 12/2010 |
| JP | 2011-002753 A | 1/2011 |
| JP | 2012-098105 A | 5/2012 |

OTHER PUBLICATIONS

Office Action for CN Patent Application No. 201410400924.0, dated May 3, 2017, 09 pages of Office Action and 15 pages of English Translation.

*Primary Examiner* — Van N Chow
(74) *Attorney, Agent, or Firm* — Chip Law Group

(57) ABSTRACT

An image capturing device includes: a display section attached to a head or a face of a user, and configured to display an image; a communication section configured to communicate with an external device; an image capturing section; a positional information acquisition section configured to acquire current positional information of the user; and a control section configured to capture an image of a dangerous place by the image capturing section in accordance with determination of a dangerous state, and transmit a captured image from the communication section to the external device together with the positional information acquired by the positional information acquisition section.

16 Claims, 26 Drawing Sheets

(51) Int. Cl.
*G02B 27/00* (2006.01)
*G02B 27/01* (2006.01)
*H04N 5/77* (2006.01)
*G01C 21/36* (2006.01)

(52) U.S. Cl.
CPC ....... *G02B 27/017* (2013.01); *H04N 5/23245* (2013.01); *H04N 5/77* (2013.01); *G01C 21/3647* (2013.01); *G01C 21/3697* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 2010/0321409 A1* | 12/2010 | Komori | G02B 27/017 345/656 |
| 2012/0069131 A1* | 3/2012 | Abelow | G06Q 10/067 348/14.01 |

\* cited by examiner

IMAGE CAPTURING DEVICE, IMAGE CAPTURING METHOD, AND INFORMATION DISTRIBUTION SYSTEM

CROSS REFERENCE TO RELATED APPLICATIONS

The present application is a continuation application of U.S. patent application Ser. No. 14/458,792 filed Aug. 13, 2014 which claims the benefit of Japanese Priority Patent Application JP 2013-173398 filed Aug. 23, 2013, the entire contents of which are incorporated herein by reference.

BACKGROUND

The present disclosure relates to an image capturing device and an image capturing method that provide images regarding a dangerous place including a source of an accident or an incident, and an information distribution system that distributes information regarding a dangerous place obtained based on images provided from one or more image capturing devices.

The knowledge of a system for sharing information obtained by monitoring automobiles while driving among vehicles is widespread. The shared information is sometimes referred to as driving information, navigation information, or vehicle information, for example. For example, a proposal has been made of an image collection system that automatically collects images in the vicinity of an accident occurrence site (for example, refer to Japanese Unexamined Patent Application Publication No. 2012-98105). The image collection system includes: a plurality of vehicles including a car navigation system, a impact detection section that detects the occurrence of an accident, an in-vehicle camera, and a storage section that stores an image captured by the in-vehicle camera in association with the corresponding time, and an information management center. When information regarding an accident is transmitted from a certain collision-damaged vehicle to the information management center, the information management center notifies the occurrence of the accident to the other vehicles, and obtains images captured by the in-vehicle cameras of the other vehicles.

In the above-described image collection system, images at a time when each traffic accident occurred are collected from vehicles other than a collision-damaged vehicle, and thus analysis precision of the cause of the accident is intended to be increased on the basis of the images from a plurality of viewpoints.

However, the images collected by the above-described image collection system are limited to the images captured by in-vehicle cameras. That is to say, the collected images are all limited to the viewpoints of the individual in-vehicle cameras. Thus, those images are different from the images from the viewpoints of the drivers, and pedestrians who happened to be at an accident site. Accordingly, those images are not necessarily images that are obtained from easily viewable and suitable viewpoints.

Also, the above-described image collection system basically starts processing in response to the detection of the occurrence of an accident, and collects images of a site where an accident has actually happened.

SUMMARY

It is desirable to provide an excellent image capturing device and an image capturing method that are capable of suitably obtaining and providing images regarding a dangerous place including a source of an accident or an incident.

It is also desirable to provide an excellent information distribution system capable of suitably distributing information regarding a dangerous place on the basis of images of the dangerous place, which were provided from image capturing devices.

According to an embodiment of the present disclosure, there is provided an image capturing device including: a display section attached to a head or a face of a user, and configured to display an image; a communication section configured to communicate with an external device; an image capturing section; a positional information acquisition section configured to acquire current positional information of the user; and a control section configured to capture an image of a dangerous place by the image capturing section in accordance with determination of a dangerous state, and transmit a captured image from the communication section to the external device together with the positional information acquired by the positional information acquisition section.

The image capturing device according to the above-described embodiment may further include at least either a state information acquisition section configured to acquire state information of the user, or an environmental information acquisition section configured to acquire environmental information, wherein the control section may determine the dangerous state on the basis of the state information or the environmental information.

In the above-described embodiment, the control section may transmit the captured image with at least either information on image captured time or attribute information of the user.

In the above-described embodiment, the state information acquisition section may acquire biological information of the user, and the control section may determine a dangerous state by itself on the basis of the biological information, or acquires a determination result of a relative dangerous state determined by an external apparatus recording a large number of pieces of data.

In the above-described embodiment, the control section may determine the dangerous state on the basis of at least any one piece of biological information among a pulse of the user, perspiration, myoelectric potential, and movement of an eyeball.

In the above-described embodiment, the control section may determine the dangerous state further in consideration of whether the user is viewing a content using the display section.

In the above-described embodiment, the control section may determine the dangerous state on the basis of an analysis result of ambient noises, winds, atmosphere (a thick fog or smoke, radioactive rays, or toxic chemical substance in an atmosphere), surrounding captured images as the environmental information.

The image capturing device according to the above-described embodiment may further include a line of sight acquisition section configured to acquire a line of sight of the user, wherein the control section determines the dangerous state on the basis of biological information of the user when the line of sight falls on a place predicted to be dangerous.

In the above-described embodiment, the control section may identify the place predicted to be dangerous on the basis of the environmental information.

The image capturing device according to the above-described embodiment may further include a line of sight acquisition section configured to acquire a line of sight of the user, wherein when the control section may determine the dangerous state, the control section captures a still image or a moving image by the image capturing section in accordance with whether or not the line of sight remained for a certain time period.

In the above-described embodiment, the control section may stop capturing the image in accordance with a change in the line of sight while capturing the moving image.

The image capturing device according to the above-described embodiment may further include a line of sight acquisition section configured to acquire a line of sight of the user, wherein the control section may identify the dangerous place, starts capturing a moving image in accordance with the line of sight falling on the dangerous place, and stops capturing the moving image in accordance with the line of sight falls off the dangerous place.

In the above-described embodiment, the control section may determine whether to capture a still image or a moving image in accordance with a level of importance of the dangerous place or a type of the dangerous place.

According to another embodiment of the present disclosure, there is provided a method of acquiring information, including: determining a dangerous state on the basis of state information or environmental information of a user; acquiring positional information in order to acquire current positional information of the user; capturing an image of a dangerous place by an image capturing section in accordance with determination of the dangerous state; and transmitting a captured image from a communication section to an external device together with the positional information acquired by the acquiring positional information.

According to another embodiment of the present disclosure, there is provided an information distribution system including: an image database configured to manage an image of a dangerous place together with positional information; and an information providing section configured to retrieve an image of a dangerous place corresponding to a current position of an information display device from the image database in order to provide the image.

Note, however, that a "system" mentioned here means a logical set of a plurality of devices (or functional modules that achieve specific functions), and thus it does not matter whether the individual devices or the functional modules are contained in a single case or not.

In the information distribution system according to the embodiment, the images of the dangerous place collected from one or more images capturing devices may be managed with individual pieces of positional information, respectively, in the image database.

In the information distribution system according to the embodiment, time information when the image of the dangerous place was captured by the image capturing device may be managed in the image database in combination, and the information providing section may retrieve an image of the dangerous place corresponding to the current position of the information display device from the image database by filtering with a current time.

The information distribution system according to the above-described embodiment may further include a user database configured to manage attribute information of a user of each image capturing device, wherein the information providing section retrieves an image of the dangerous place corresponding to the current position of the information display device from the image database by filtering with attribute information of a user of an information display device of the providing destination in order to provide the image.

In the information distribution system according to the embodiment, the information providing section may provide a hazard map created by mapping each dangerous place stored in the image database onto a map.

In the information distribution system according to the embodiment, when a plurality of images are retrieved for the current position of the information display device, the information providing section may narrow down the images to a predetermined number of images using any one of the following methods, (A) performing an image search using a default search condition, (B) performing an image search using a search condition specified by an information display device, and (C) transmitting necessary information to an information display device, and the information display device performing an image search using a desired search condition.

With a technique disclosed in this specification, it is possible to provide an excellent image capturing device and an image capturing method that are capable of suitably obtaining and providing images regarding a dangerous place including a source of an accident or an incident.

Also, with a technique disclosed in this specification, it is possible to provide an excellent information distribution system capable of suitably distributing information on a dangerous place on the basis of images regarding the dangerous place, which were provided from image capturing devices.

In this regard, the advantages described in this specification are only examples. The advantages of this disclosure are not limited to this. Also, additional advantages may further be given by the present disclosure in addition to the above-described advantages.

Other objects, features, and advantages of the technique disclosed in this specification will become apparent from the more detailed description of the embodiments described below with the accompanying drawings.

DETAILED DESCRIPTION OF EMBODIMENTS

In the following, a detailed description will be given of an embodiment of a technique disclosed in this specification with reference to the drawings.

Figure 1:
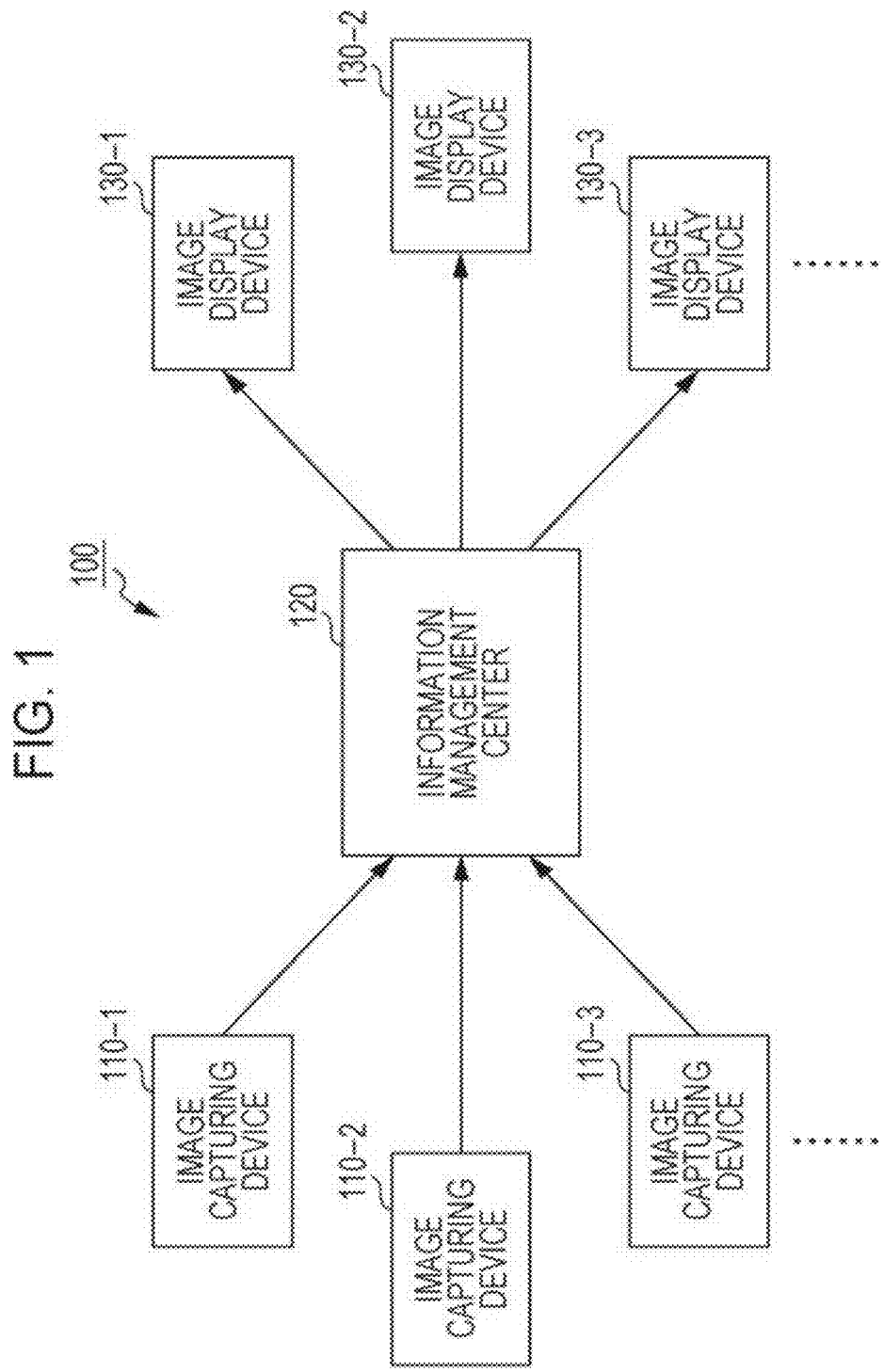
FIG. 1 is a diagram schematically illustrating a configuration of an information distribution system according to an embodiment of a technique disclosed in this specification.

FIG. 1 schematically illustrates a configuration of an information distribution system 100 according to an embodiment of a technique disclosed in this specification. The information distribution system 100 illustrated in FIG. 1 includes image capturing devices 110-1, 110-2, 110-3, . . . , which capture and provide images of a dangerous place including a source of an accident and an incident, an information management center 120, which collects images provided from the individual image capturing devices 110-1, 110-2, 110-3, . . . , and distributes information on the dangerous place, and information display devices 130-1, 130-2, 130-3, . . . , which receive the information distributed from the information management center 120 to display the information.

In this regard, it is assumed that the information management center 120 is a server apparatus built on a wide area network, such as the Internet, and the like. However, the information management center 120 may be replaced by services provided using cloud technology, or some of the image capturing devices 110 or the information display devices 130 may share the functions of the information management center 120. Also, it is assumed that information transfer is performed between the image capturing device 110 and the information display device 130 by a point-to-point connection without communication through the information management center 120.

In the present embodiment, each of the image capturing devices 110-1, 110-2, 110-3, . . . , is basically configured in a style in which a user wears the image capturing device on his or her head or face in the manner of a head mounted display, and is used all the time when the user is walking or driving a vehicle, or the like. A description will be given later of a specific configuration of the head mounted display.

On the other hand, the information display devices 130-1, 130-2, 130-3, . . . , display information to moving users. Of course, it is possible to display information to a user who remains indoors. The information display devices 130-1, 130-2, 130-3, . . . , may be a multifunctional mobile terminal, for example, a head mounted display, a smart phone, or the like, or a head up display, or the like. Among these, a head up display is applied to a windshield of a vehicle, or the like, and for example, is capable of displaying an enlarged information to a visual field of a user who is in the vehicle. Also, some of the individual image capturing devices 110-1, 110-2, 110-3, . . . may function as the information display device 130 in a situation other than the case of collecting images.

When a user who is wearing each of the image capturing devices 110-1, 110-2, 110-3, . . . , encounters a danger, a corresponding image capturing device transmits an image of the site (a moving image or a still image) to the information management center 120 together with the positional information of the site. At that time, each image capturing device may transmit attached information, such as time of the encounter with the danger, information regarding an encountered danger category (an accident, an incident, or a minor incident) (or an information tag to be used for identifying a danger category), user attribute information including a personal attribute of the user (gender, age, character, occupation, and the like), a behavioral attribute, and the like. In the case where the information management center 120 manages user attribute information in a database, each image capturing device may transmit only a user-ID.

Each of the image capturing devices 110-1, 110-2, 110-3, . . . , automatically detects that the user who is wearing the device has encountered a dangerous place on the basis of the user's biological information, and the like, and automatically captures an image of the site. Of course, the user may notify the image capturing device that the user has encountered a dangerous place by manual operation. A detailed description will be given later of a method of automatically detecting an encounter with a dangerous place.

The information management center 120 manages images of the dangerous place that have been transmitted, that is to say, provided from each of the image capturing devices 110-1, 110-2, 110-3, . . . , in association with positional information. Also, the information management center 120 may classify the images provided from each of the image capturing devices 110-1, 110-2, 110-3, . . . , for each danger category as necessary, and may manage the images in association not only with the positional information, but also with the other information, such as the user attribute information (described above), and the like.

The information management center 120 monitors information on the current position of each of the information display devices 130-1, 130-2, 130-3, . . . , all the time. Alternatively, the information display device 130 that requests information regarding a dangerous place may transmit the information on the current position of itself to the information management center 120.

Then, the information management center 120 makes a search with a current position of each of the information display devices 130-1, 130-2, 130-3, . . . . Then, if a matching dangerous place is found, the information management center 120 transmit a captured image of the site, or information regarding a dangerous place obtained by an image analysis to a corresponding information display device 130.

Also, the information management center 120 may perform matching not only using the current position, but may perform filtering with a personal attribute or a behavioral attribute of a user who uses each of the information display devices 130-1, 130-2, 130-3, . . . and then may transmit an image or information regarding a dangerous place obtained by image analysis if only necessary. This is because there are sites that are dangerous to women, and but not to men, sites that are dangerous to infants or elderly people in particular, and there are cases where it is dangerous when running, but not dangerous in particular and unnecessary to pay attention when walking, and the like. If information is transmitted to a user who is not in danger, it becomes a useless warning, and thus information will not be accepted seriously in the case of a real danger.

When each of the information display devices 130-1, 130-2, 130-3, . . . , receives an image of a dangerous place, or information regarding a dangerous place obtained by image analysis from the information management center 120, the information display device displays the image or the information so as to give a warning against a danger to the user who is carrying the device.

For example, if the information display device 130 is a head mounted display, or a head up display, information is displayed by being overlaid on a dangerous place in the visual range of the user so as to effectively notify the user of a danger in order to avoid the danger.

Also, the information display device 130 may further call user's attention by giving sound output, such as sound effect, or the like, vibration, performing tactile feedback in addition at a time when displaying a captured image of a dangerous place.

As described above, each of the image capturing devices 110-1, 110-2, 110-3, . . . , is basically configured in the form of a head mounted display to be used by the user wearing the device on his/her head or face, and is used by the user wearing the device all the time while the user is walking or driving a vehicle.

Figure 2:
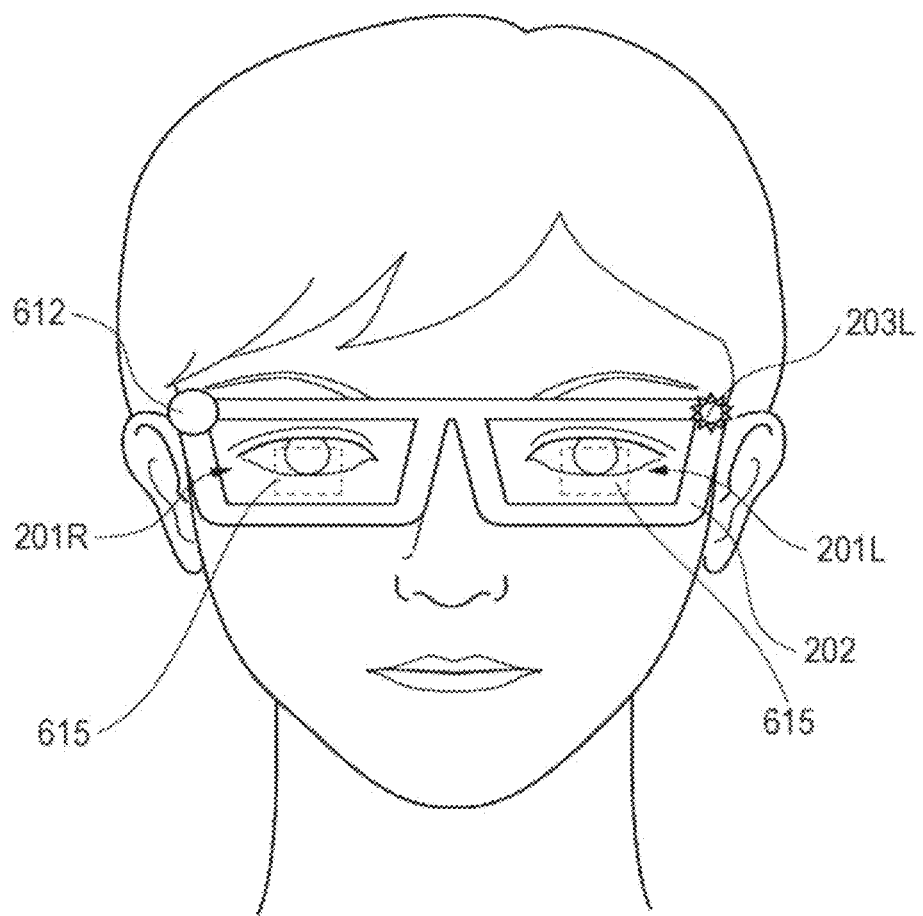
FIG. 2 is a front view of a state of a user wearing an image capturing device configured as a transmissive head mounted display.

FIG. 2 illustrates a front view of a state of a user wearing the image capturing device 110 configured as a transmissive head mounted display. The image capturing device 110 illustrated in FIG. 2 is transmissive, that is to say, see-through type, and thus it is possible for the user to view a scene of a real world (that is to say, see-through) through the image while an image is displayed to the user. Accordingly, it is possible to view a virtual display image, such as an AR (Augmented Reality) image, and the like on a scene of a real world (for example, refer to Japanese Unexamined Patent Application Publication No. 2011-2753). Also, the displayed image is difficult to see from the outside (that is to say, by other people), and thus privacy is easy to be protected when information is displayed.

The image capturing device 110 illustrated in FIG. 2 has a structure similar to glasses for vision correction. Virtual image optical sections 201L and 201R including transparent light guiding sections, and the like, respectively, are disposed at positions opposed to right and left eyes of a user of the main body of the image capturing device 110. An image observed by the user (not illustrated in FIG. 2) is displayed inside each of the virtual image optical sections 201L and 201R. Each of the virtual image optical sections 201L and 201R is supported by a holding body 202, which is like a frame of glasses, for example.

An outside camera 612 for inputting a surrounding image (user's visual range) is disposed substantially at the center of the holding body 202 glasses, which is like a frame of glasses. The outside camera 612 is capable of capturing a scene in the direction of the line of sight of the user, for example. It is desirable to configure the outside camera 612 by a plurality of cameras in order to obtain three-dimensional information of a surrounding image using binocular disparity information.

Also, microphones 203L and 203R are disposed in the vicinity of both of the right and left ends of the holding body 202, respectively. By substantially holding the microphones 203L and 203R in bilaterally symmetrical manner, it is possible to recognize only sound that is oriented in the center (user' voice). Thereby, it is possible to separate the user' voice from ambient noises, and speech sound of the other people, and thus to prevent malfunction at the time of operation by voice input, for example.

Also, outside display sections 615 which enables external people to observe outside images are disposed at the outside of the main body of the image capturing device 110. In the example in FIG. 2, a pair of right and left outside display sections 615 are disposed. However, a single or not less than three display sections 615 may be disposed. The outside images may be either the same image as that of a display section 609, or a different image.

Figure 3:
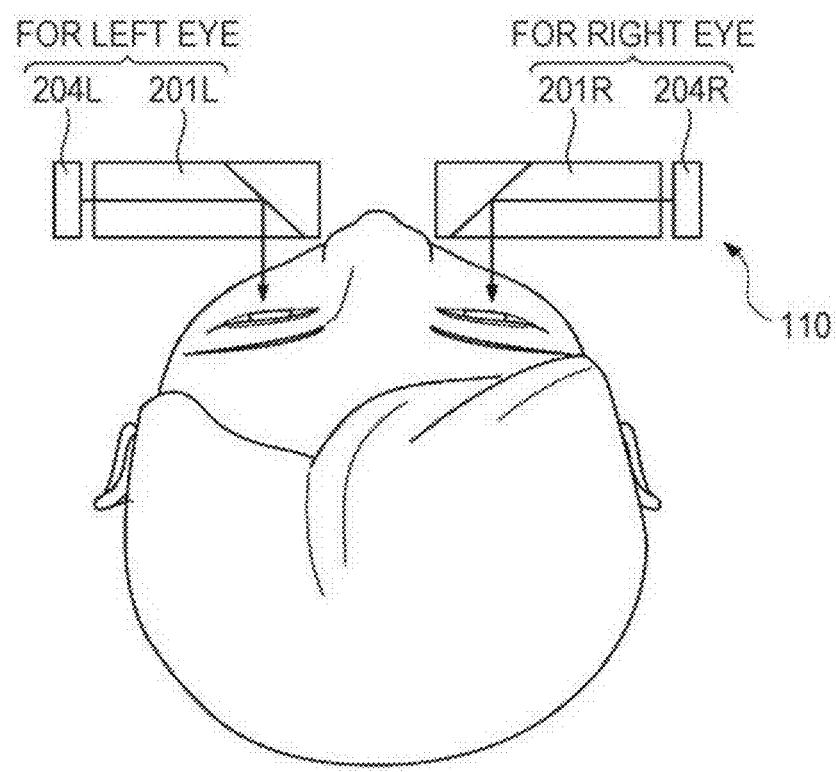
FIG. 3 is a top view of the user wearing the image capturing device illustrated in FIG. 2.

FIG. 3 illustrates a top view of the user wearing the image capturing device 110.

As illustrated in FIG. 3, display panels 204L and 204R for outputting left-eye and right-eye images are disposed at both of the left and right ends of the image capturing device 110, respectively. Each of the display panels 204L and 204R includes a micro display, such as a liquid crystal display or an organic EL element, or the like, or a laser scanning method display, such as a retinal direct drawing display, or the like. The left and right display images output from the display panels 204L and 204R are led in the vicinity of left and right eyes through the virtual image optical sections 201L and 201R, respectively, and the enlarged virtual image is formed on the pupil of a user. Although the detailed illustration is omitted, the virtual image optical sections 201L and 201R include an optical system condensing light emitted from the micro display, an optical waveguide disposed at the position of entering light passing through the optical system, a polarization filter reflecting incident light to the optical waveguide, and a polarization filter outputting light propagated by being totally reflected in the optical waveguide to the eye of the user, respectively.

Figure 4:
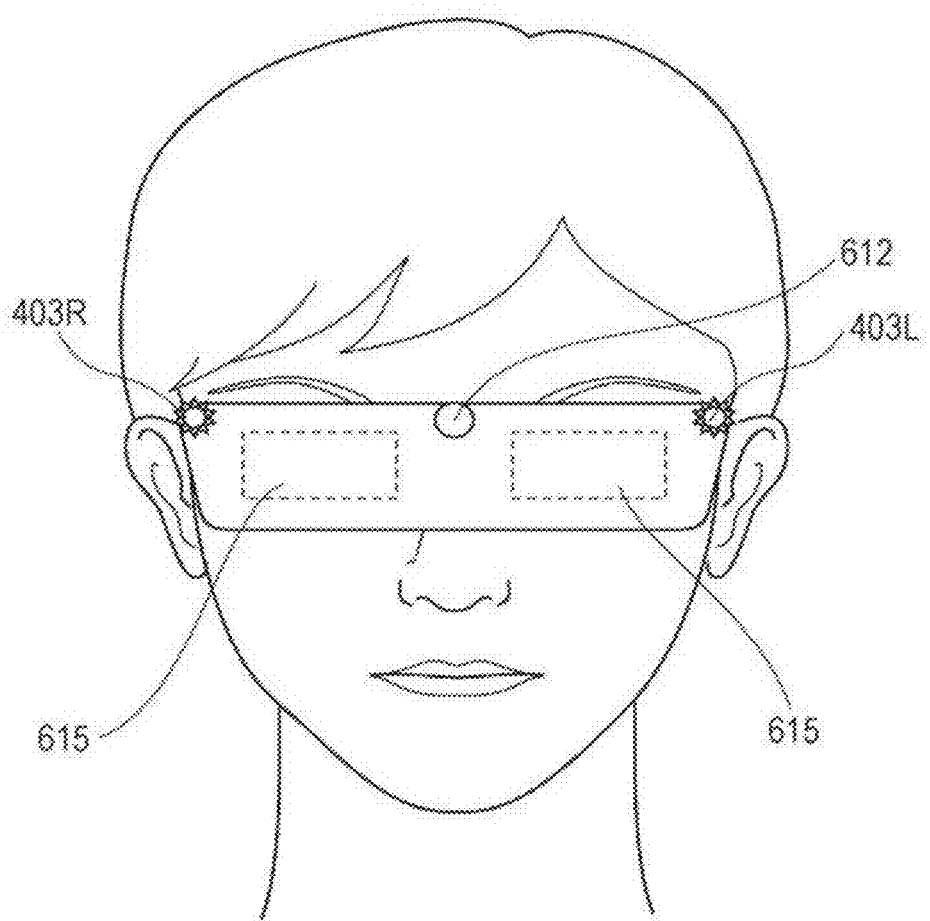
FIG. 4 is a front view of a state of a user wearing an image capturing device configured as a shading head mounted display.

Also, FIG. 4 illustrates a front view of a state of a user wearing the image capturing device 110 configured as a shading head mounted display.

The image capturing device 110 directly covers the eyes of the user when the user wears the device on his/her head or face, and thus allows to give the user who is viewing an image an immersion feeling. Also, unlike the see-through type, the user who is wearing the image capturing device 110 is not allowed to directly see a scene of a real world. However, by providing the outside camera 612 that captures an image of a scene in the user' direction of the line of sight, and displaying the captured image, it is possible for the user to indirectly view a scene of a real world (that is to say, display a scene by video see-through). Of courser, it is possible to display a virtual display image, such as an AR image, in an overlaying manner on a video see-through image. Also, the display image is not allowed to be seen from the outside (that is to say, by the other people), it is easy to protect privacy at the time of information display.

The image capturing device 110 illustrated in FIG. 4 has a structure having a similar shape as a headgear, and the image capturing device 110 directly covers left and right eyes of the user who is wearing the device. The display panels observed by the user (not illustrated in FIG. 4) are disposed at positions opposed to right and left eyes of a user of the inner main body of the image capturing device 110. The display panel includes a micro display, such as an organic EL element or a liquid crystal display, or the like, for example, or a laser scanning method display, such as a retinal direct drawing display, or the like.

An outside camera 612 for inputting a surrounding image (user's visual range) is disposed substantially at the center of the front body of the image capturing device 110. Also, microphones 403L and 403R are disposed in the vicinity of both of the left and right ends of the main body of the image capturing device 110, respectively. By substantially holding the microphones 403L and 403R in bilaterally symmetrical manner, it is possible to recognize only sound that is oriented in the center (user' voice). Thereby, it is possible to separate the user' voice from ambient noises, and speech sound of the other people, and to thus prevent malfunction at the time of operation by voice input, for example.

Figure 5:
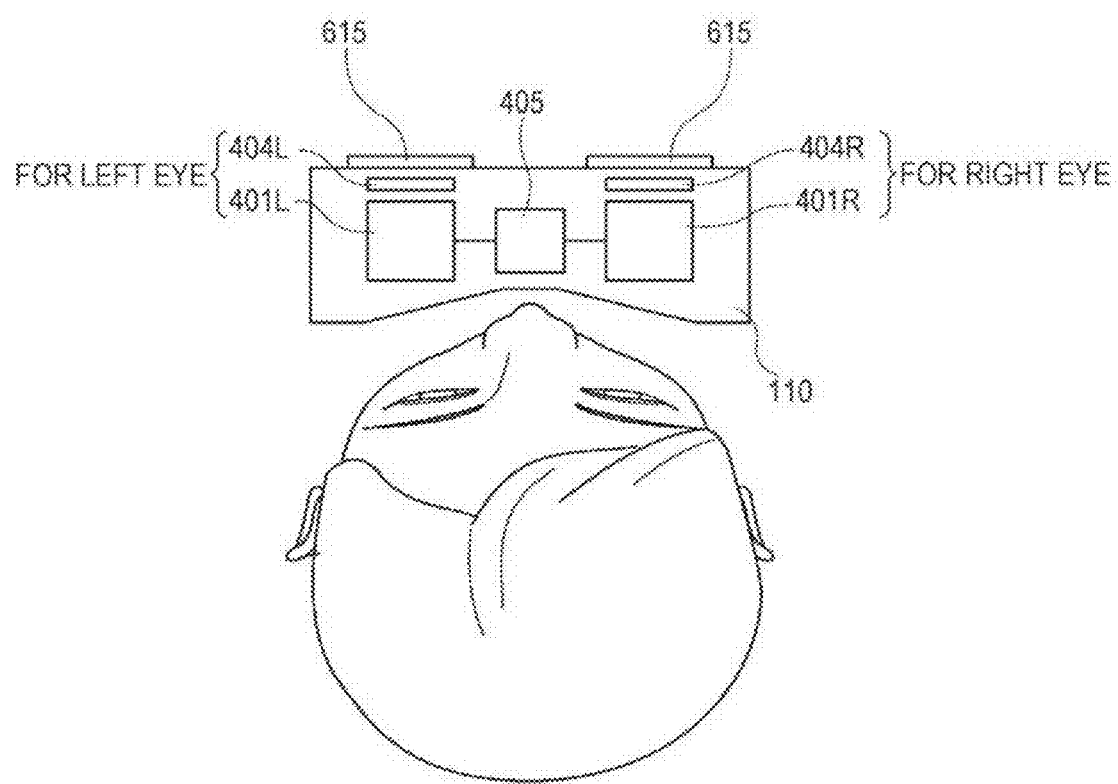
FIG. 5 is a top view of the user wearing the image capturing device illustrated in FIG. 4.

FIG. 5 illustrates a top view of the user wearing the image capturing device 110 illustrated in FIG. 4. The image capturing device 110 illustrated in FIG. 5 includes the display panels 404L and 404R for a left-eye and a right-eye, respectively, at the side face of the opposed side to the user's face. Each of the display panels 404L and 404R includes a micro display, such as an organic EL element, or a liquid crystal display, or the like, for example, or a laser scanning method display, such as a retinal direct drawing display, or the like. The display images of the display panels 404L and 404R are observed by the user as an enlarged virtual image by passing through the virtual image optical sections 401L and 401R, respectively. Also, an eye height and an eye width are different for each user, and thus it is necessary to position each of the left and right display systems and the user's eyes, respectively. In the example in FIG. 5, an eye-width adjustment mechanism 405 is provided between the right-eye display panel and the left-eye display panel.

Also, outside display sections 615 which enables external people to observe outside images are disposed at the outside of the main body of the image capturing device 110. In the example in FIG. 5, a pair of right and left outside display sections 615 are disposed. However, a single or not less than three display sections 615 may be disposed. The outside images may be either the same image as that of a display section 609, or a different image.

Figure 6:
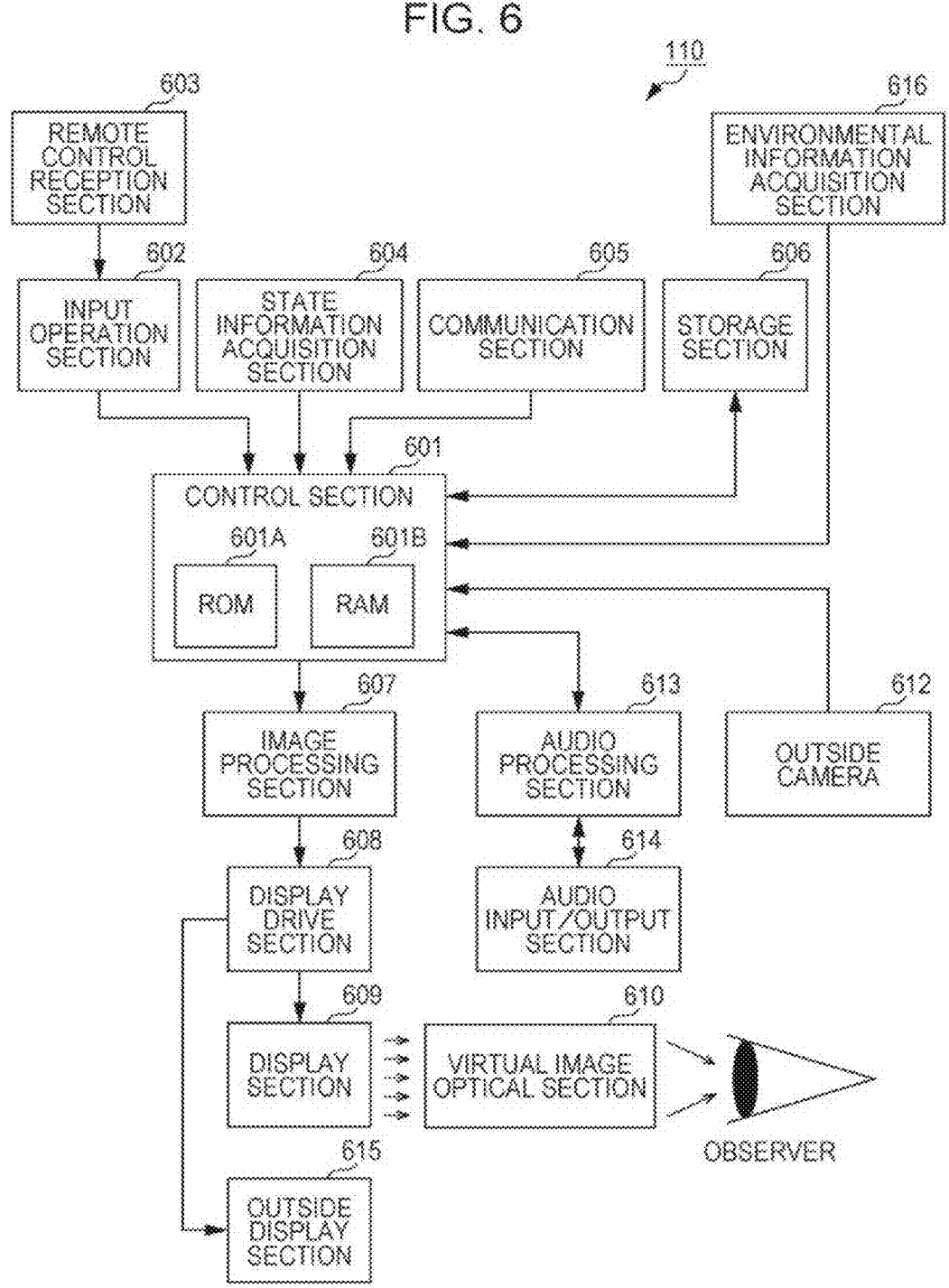
FIG. 6 is a diagram illustrating an example of an internal configuration of the image capturing device.

FIG. 6 illustrates an example of an internal configuration of the image capturing device 110. Both of the transmissive type illustrated in FIG. 2 and FIG. 3, and the immersion type illustrated in FIG. 4 and FIG. 5 have substantially the same configuration. In the following, a description will be given of each section.

A control section 601 includes a ROM (Read Only Memory) 601A and a RAM (Random Access Memory) 601B. The ROM 601A stores the program code to be executed in the control section 601, and various kinds of data. The control section 601 executes the program loaded in the RAM 601B so as to totally control overall operation of the image capturing device 110 as a head mounted display including display control of an image. The programs and the data that are stored in the ROM 601A include an image display control program, an image providing program that detects an encounter with a dangerous place by the device 110 (or by the user wearing the corresponding device 110), and captures an image of the dangerous place to transmit the image to the information management center 120, specific identification information of the device 110, user attribute information (described above) of the user who uses the device 110, and the like.

An input operation section 602 includes one or more operators with which the user performs input operation, such as a key, a button, a switch, and the like, and receives a user' instruction through the operators, and outputs the instruction to the control section 601. Also, the input operation section 602 accepts a user's instruction included in a remote control command received by the remote control reception section 603, and outputs the instruction to the control section 601.

A state information acquisition section 604 is a functional module for obtaining state information of the main body of the image capturing device 110, or a user who is wearing the device 110. The state information acquisition section 604 may includes various sensors for detecting the state information of itself, or may obtain the state information from an external device (for example, a watch or a smart phone worn by the user, and the other multifunctional terminals) including a part of or all of these sensors through a communication section 605 (described later).

The state information acquisition section 604 obtains information on the position and posture of a user' head, and posture, for example. The state information acquisition section 604 may include any one of or a combination of two or more sensors in consideration of merits and demerits of each sensor of a gyro sensor, an acceleration sensor, a GPS (Global Positioning System) sensor, a geomagnetic sensor, a Doppler sensor, an infrared sensor, a radio field intensity sensor, and the like in order to obtain position and posture information. Also, the state information acquisition section 604 may use a combination of information provided from various kinds of infrastructure, such as mobile-phone base station information, PlaceEngine (registered trademark) information (radio measurement information from a wireless LAN access point), and the like in order to obtain the position and posture information.

Also, a state information acquisition section 504 obtains, for example, the user' working state (whether the user is wearing the image capturing device 110 or not), the user's behavioral state (movement state, such as stationary, walking, running, or the like, an open or shut state of an eyelid, a direction of line of sight, the size of a pupil), a mental condition (a degree of impression, such as whether the user is immersed or concentrated while observing a display image, and the like, a degree of excitement, a degree of arousal, feeling, emotion, and the like), and further, a physiological state as state information of the user who is wearing the image capturing device 110. Also, the state information acquisition section 604 may include various state sensors, such as a wearable sensors including a mechanical switch, and the like, an inner camera to capture a user's face, a gyro sensor, an acceleration sensor, a speed sensor, a pressure sensor, a temperature sensor to detect a body temperature or air temperature, a perspiration sensor, a pulse sensor, a myoelectric potential sensor, an electro oculography sensor, a brainwave sensor, a breath sensor, a gas ion concentration sensor, and a timer (all of these are not illustrated in FIG. 6) in order to obtain these pieces of state information from the user.

An environmental information acquisition section 616 is a functional module that obtains information on the main body of the image capturing device 110, or an environment surrounding the user who is wearing the device 110. The information regarding environment here includes sound, air flow, air temperature, atmospheric pressure, atmosphere (smoke, thick fog, electromagnetic waves to which the device 110 or the user is exposed (ultraviolet ray, blue light, and radio wave), heat ray (infrared ray), radioactive ray, carbon monoxide and carbon dioxide in the atmosphere, nitrogen compound (nicotine), nitrogen oxides (NOx) floating in the atmosphere, and a hydrocarbon (volatile organic compounds (VOC) or, photochemical smog produced by photochemical reaction under the influence of ultraviolet rays on these, powder dust, such as particulate matter, pollen, house dust, and the like, toxic chemicals, such as asbestos), and the other environmental factors. The environmental information acquisition section 616 may include various environmental sensors including a sound sensor, air flow sensor in order to detect environmental information. The above-described microphone and the outside camera 612 may be included in the environmental sensor. Alternatively, the environmental information acquisition section 616 may obtain the environmental information from an external device including a part of or all of these sensors (for example, a smart phone, a watch, and the other multifunctional terminals that are worn by the user) through the communication section 605 (described later).

The outside camera 612 is disposed substantially at the center of the front face of the main body of the image capturing device 110 (refer to FIG. 2 and FIG. 4), for example, and is capable of capturing the surrounding image. Also, by performing posture control of the outside camera 612 in a panning, a tilting, and a rolling direction in synchronism with the direction of the user's line of sight obtained by the state information acquisition section 604, it is possible to capture an image in the user's eye direction, that is to say, an image in the direction of the user's line of sight, by the outside camera 612. It is further preferable to configure the outside camera 612 by a plurality of cameras using binocular disparity information in order to obtain three dimensional information of the surrounding image. It is assumed that the user is allowed to adjust zooming of the outside camera 612 through operation of the input operation section 602, the size of the pupil of the eye, which is recognized by an inside camera, a myoelectric potential sensor, or the like, and voice input. It is possible to output the image captured by the outside camera 612 to the display section 609, and also, to store the image into a storage section 606. In the present embodiment, an image of a dangerous place that the user has encountered is captured by the outside camera 612. The details thereof will be described later.

The communication section 605 performs communication processing with an external device, and modulation/demodulation, and encoding/decoding processing on a communication signal. As an example of the external device, it is possible to give a content playback apparatus (a Blu-ray disc or a DVD player), which provides a viewing content at a time when the user uses the image capturing device 110 as a head mounted display, a streaming server, and an information management center 120 on the Internet. Also, the control section 601 outputs transmission data to an external device from the communication section 605.

The communication section 605 may have any configuration. For example, it is possible to configure the communication section 605 in accordance with a communication method to be used for transmission/reception operation with an external device to be the other party of the communication. The communication method may be either wired or wireless mode. The communication standards mentioned here include MHL (Mobile High-definition Link), USB (Universal Serial Bus), HDMI (registered trademark) (High Definition Multimedia Interface), Wi-Fi (registered trademark), Bluetooth (registered trademark) communication, BLE (Bluetooth (registered trademark) Low Energy) communication, ultralow-power wireless communication, such as ANT and the like, a mesh network standardized by IEEE802.11s, and the like. Alternatively, the communication section 605 may be a cellular radio transmitter/receiver, which operates in accordance with standard specifications, such as W-CDMA (Wideband Code Division Multiple Access), LTE (Long Term Evolution), and the like, for example.

As described later, an image of a dangerous place, or the like, which is captured by the outside camera 612, is transmitted from the communication section 605 to the information management center 120. However, the captured image itself is sometimes not transmitted to the information management center 120, but is uploaded to an image sharing site, and a URL (Uniform Resource Locator), or a URI (Uniform Resource Identifier), which indicates information for accessing an uploaded image, may be transmitted to the information management center 120.

The storage section 606 is a mass storage device including an SSD (Solid State Drive), or the like. The storage section 606 stores application programs to be executed by the control section 601, and various kinds of data. For example, a content viewed by the user using the image capturing device 110 as a head mounted display is stored in the storage section 606. Also, in the present embodiment, a scene image captured by the outside camera 612 (dangerous place, and the like) is stored in the storage section 606 in association with the positional information and the time information, which were obtained by the state information acquisition section 604, and further, the environmental information obtained by the environmental information acquisition section 616.

An image processing section 607 further performs signal processing, such as image quality correction, and the like on the image signal output from the control section 601, and performs resolution conversion to meet the screen of the display section 609. Then, the display drive section 608 selects the pixels of the display section 609 for each line in sequence, performs line sequential scanning, and supplies a pixel signal based on the image signal having been subjected to the signal processing.

The display section 609 includes a display panel including a micro display, such as a an organic EL (Electro-Luminescence) element, a liquid crystal display, or the like, for example, or a laser scanning method display, such as a retinal direct drawing display, or the like. The virtual image optical section 610 performs extended projection of the display image of the display section 609 to allow the user to observe an enlarged virtual image.

In this regard, as an example of the display image output by the display section 609, it is possible to give a content playback apparatus (a Blu-ray disc or a DVD player), or a commercial content supplied from a streaming server, and a captured image by the outside camera 612, and the like. If the image capturing device 110 is a see-through type as illustrated in FIG. 2 and FIG. 3, it is possible for the user to view a scene of a real world through the image (including a time when an image is not displayed).

Also, the display screen of the outside display section 615 faces the outside of the image capturing device 110 (in the opposite direction of the face of the user wearing the device), and thus it is possible to display the outside image to the other users. The outside image may be either the same image as that of the display section 609, or a different image. For the detailed configuration of the outside display section 615, refer to the specifications of Japanese Patent Application Nos. 2012-200902 and 2012-200903, respectively, which have already been assigned to the present applicant, for example. Note that the outside display section 615 is not an indispensable component for achieving the technique disclosed in this specification.

An audio processing section 613 performs sound quality correction and sound amplification on the audio signal output from the control section 601, and further performs signal processing on the input audio signal, and the like. Then, an audio input/output section 614 outputs the sound after having been subjected to the audio processing, and performs audio input from the microphone (described above).

The information management center 120 is a server apparatus, or the like on a wide area network, such as the Internet, and can be built using a general computer system. Alternatively, the information management center 120 may not be physically configured in a single computer system, but may be configured as a service provided using a cloud technology, and may be configured in some of the information display devices 130.

Figure 7:
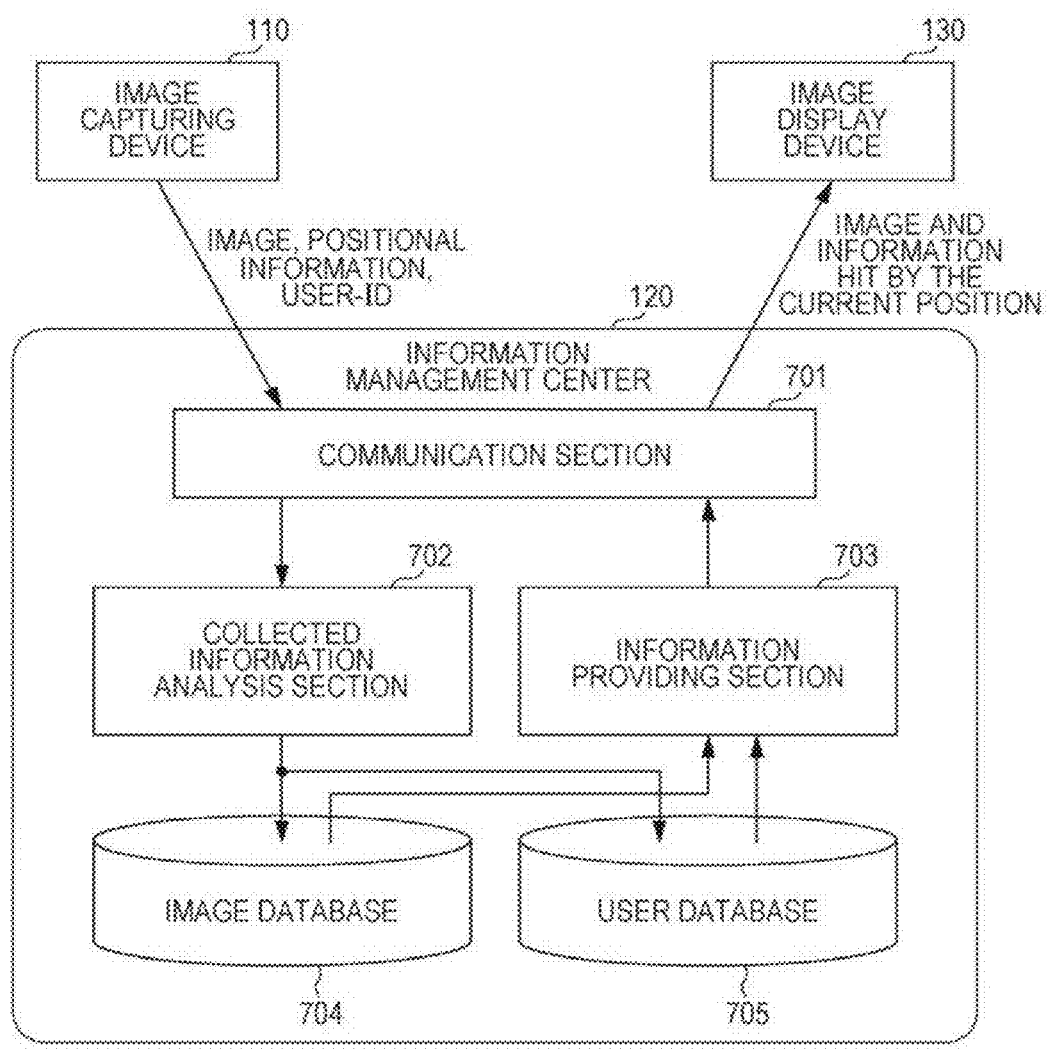
FIG. 7 is a diagram schematically illustrating a functional configuration of an information management center.

FIG. 7 schematically illustrates a functional configuration of the information management center 120. The information management center 120 illustrated in FIG. 7 includes individual functional modules of a communication section 701, a collected information analysis section 702, an information providing section 703, an image database 704, and a user database 705. Each of the functional modules may be configured by dedicated hardware, or may also be achieved by executing predetermined programs on a computer system.

The communication section 701 performs communication with each of the image capturing devices 110-1, 110-2, 110-3, . . . , and each of the information display devices 130-1, 130-2, 130-3, . . . , through a wide area network, such as the Internet, or the like.

The collected information analysis section 702 analyzes information transmitted from each of the image capturing devices 110-1, 110-2, 110-3, . . . . Specifically, when the collected information analysis section 702 analyzes an image of a dangerous place, the collected information analysis section 702 stores the image into the image database 704 in association with positional information. If image captured time, a user-ID, an information tag for identifying a danger category, and the like are transmitted together with the image, the collected information analysis section 702 also stores these pieces of information together into the image database 704.

Figure 8A:
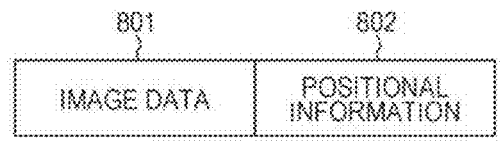
FIG. 8A is a diagram illustrating an example of a data structure for managing images in an image database.
Figure 8B:
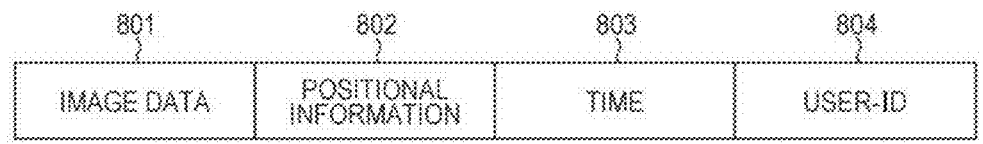
FIG. 8B is a diagram illustrating an example of a data structure for managing images in an image database.
Figure 8C:
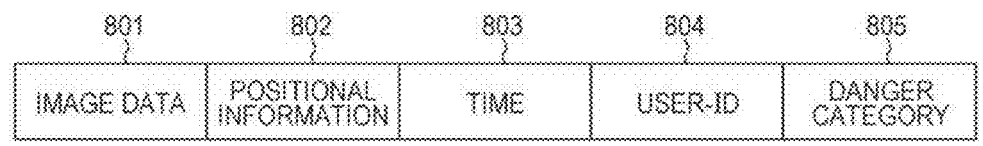
FIG. 8C is a diagram illustrating an example of a data structure for managing images in an image database.

FIGS. 8A, 8B, and 8C illustrate an example of a data structure for managing images that were collected from each of the image capturing devices 110-1, 110-2, 110-3, . . . , in the image database 704. FIG. 8A illustrates a basic data structure. One record in the image database 704 is formed by a combination image data 801, which is a moving image or a still image produced by capturing a dangerous place, and positional information 802 for identifying the site thereof. The image data 801 may not be the entity of data, but may be a location (an image sharing site, or the like) for storing the image data, or a URL or a URI that indicates accessing information. For example, a URL of the image content uploaded to an image sharing site may be entered in the field of the image data 801. Also, the notation method of the positional information 802 is not limited in particular as long as it is suitable for matching processing. For example, a latitude and a longitude, or an address may be given.

FIG. 8B and FIG. 8C illustrate variations of a data structure for managing an image in the image database 704, respectively. In the example illustrated in FIG. 8B, fields of time 803 and user-ID 804 are further added to the data structure illustrated in FIG. 8A. Also, in the example illustrated in FIG. 8C, a field indicating a danger category 805 is added.

Referring back to FIG. 7 again, a description will be given of the configuration of the information management center 120 next. The collected information analysis section 702 performs image analysis on the images collected from the individual image capturing devices 110-1, 110-2, 110-3, . . . . Specifically, by image analysis, a determination is made as to whether a dangerous place depends on time (for example, whether it is a dangerous place where a suspicious person is liable to appear after sunset, or it is a dangerous place by congestion during the rush hours) is made by the environmental information or the information tag (described above) attached to the image. Alternatively, identification may be made of a category (is it an accident, an incident, or a minor incident?) of a danger that the user who is a provider of the image has encountered. These analysis results may be stored in the image database 704 in association with the image.

Figure 9:
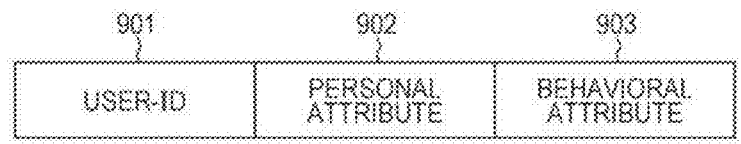
FIG. 9 is a diagram illustrating an example of a data structure for managing users in a user database.

The user database 705 manages user information of each of the image capturing devices 110-1, 110-2, 110-3, . . . , and each of the information display devices 130-1, 130-2, 130-3, . . . . FIG. 9 illustrates an example of a data structure for managing users in the user database 705. In the example illustrated in FIG. 9, one record in the user database 705 includes individual fields of a user's personal attribute (gender, age, character, occupation, and the like) 902, and a user attribute information 903 including a behavioral attribute, and the like, and these fields are managed in association with a user-ID 901.

The information providing section 703 is allowed to obtain information on the current position of each of the information display devices 130-1, 130-2, 130-3, . . . , through the communication section 701. Then, the information providing section 703 searches the image database 704 for a record corresponding to the current position of each of the information display devices 130-1, 130-2, 130-3, . . . . If the corresponding record is found, the information providing section 703 transmits the image stored in the record of the dangerous place, or information on the dangerous place, obtained by the image analysis, to the information display device 130.

Also, the information providing section 703 may perform matching not only using the current position, but may perform filtering with the personal attribute or the behavioral attribute of a user who uses each of the information display devices 130-1, 130-2, 130-3, . . . , using the user database 705, and then may transmit an image or information regarding a dangerous place obtained by image analysis if only necessary. This is because there are sites that are dangerous to women, and but not to men, sites that are dangerous to infants or elderly people in particular, and there are cases where it is dangerous when running, but not dangerous in particular and unnecessary to pay attention when walking, and the like. If information is transmitted to a user who is not in danger, it becomes a useless warning, and thus information will not be accepted seriously in the case of a real danger.

The information display device 130 displays information to moving users (of course, it is possible to display information to a user who remains indoors). The information display device 130 is a multifunctional mobile terminal, such as a head mounted display, a smart phone, and the like, or a head up display which outputs enlarged information in a visual range, such as a windshield of a vehicle, and the like, and which is allowed to communicate with the information management center 120 through a wide area network, such as the Internet.

Figure 10:
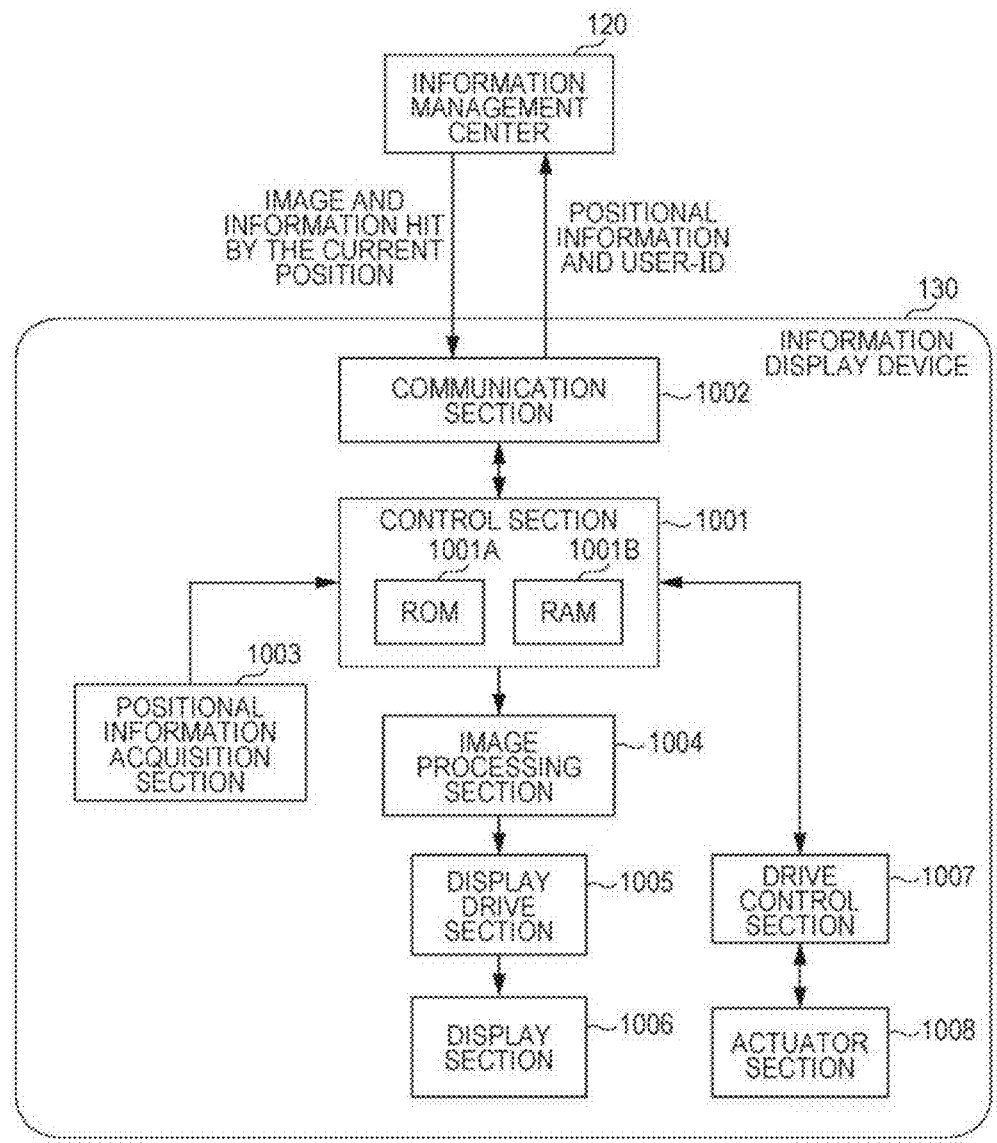
FIG. 10 is a diagram schematically illustrating a functional configuration of an information display device.

FIG. 10 schematically illustrates a functional configuration of the information display device 130. The information display device 130 illustrated in FIG. 10 includes each of functional modules of a control section 1001, a communication section 1002, a positional information acquisition section 1003, an image processing section 1004, a display drive section 1005, a display section 1006, a drive control section 1007, and an actuator section 1008. Each of the functional modules may be configured by dedicated hardware, and may also be achieved by executing predetermined programs on a computer system.

The control section 1001 includes a ROM 1001A and a RAM 1001B. The ROM 1001A stores the program code executed by the control section 1001, and various kinds of data. The control section 1001 executes the program loaded in the RAM 1001B so as to totally control overall operation of the information display device 130, which includes display control of images. As examples of the program and the data that are stored in the ROM 1001A, it is possible to give a communication control program with external devices, such as the information management center 120, and the like, a display control program of images (of a dangerous place) that are received from the information management center 120, a feedback control program in accordance with display of a dangerous place that the user of the information display device 130 has encountered, specific identification information to information display device 130, and user attribute information (described above) of the user who is using the information display device 130, and the like.

The positional information acquisition section 1003 obtains information on the current position or posture of the information display device 130 or the user. The positional information acquisition section 1003 may include any one of or a combination of two or more sensors in consideration of merits and demerits of each sensor of a gyro sensor, an acceleration sensor, a GPS sensor, a geomagnetic sensor, a Doppler sensor, an infrared sensor, a radio field intensity sensor, and the like in order to obtain position and posture information. Also, the positional information acquisition section 1003 may use a combination of information provided from various kinds of infrastructure, such as mobilephone base station information, PlaceEngine (registered trademark) information, and the like in order to obtain the position and posture information.

The control section 1001 transmits the position and posture information obtained by the positional information acquisition section 1003 to the information management center 120 through the communication section 1002. Also, when the control section 1001 transmits the position and posture information, the control section 1001 may read the user attribute information from the ROM 1001A as necessary, and may transmit the user attribute information together.

As already described, the information management center 120 searches the image database 704 on the basis of the received positional information. If a matched dangerous place is found, the information management center 120 transmits the captured image of the place, or the information regarding the dangerous place obtained by image analysis to the information display device 130. Also, the information management center 120 sometimes performs filtering with a personal attribute or a behavioral attribute of a user who uses each of the information display devices 130 using the user database 705, and then transmits an image or information regarding the dangerous place obtained by image analysis if only necessary.

Then, the control section 1001 presents the image provided from the information management center 120 to the user through the display section 1006. Specifically, the image processing section 1004 further performs signal processing, such as image quality correction, and the like on the image signal output from the control section 1001, and performs resolution conversion to meet the screen of the display section 1006. Then, the display drive section 1005 selects the pixels of the display section 1006 for each line in sequence, performs line sequential scanning, and supplies a pixel signal based on the image signal having been subjected to the signal processing.

If the information display device 130 is a head mounted display, or a head up display, information is displayed by being overlaid on a dangerous place in the visual range of the user so as to effectively notify the user of a danger in order to avoid the danger.

Also, the control section 1001 may further call user's attention by giving sound output, such as sound effect, or the like, vibration, performing tactile feedback in addition at a time when displaying the captured image of a dangerous place at the display section 1006. The actuator section 1008 includes one or more output device groups for physically outputting feedback to the user. The control section 1001 controls operation of the actuator section 1008 through the drive control section 1007. Note that the drive control section, and the actuator section 1008 are optional components.

Figure 11:
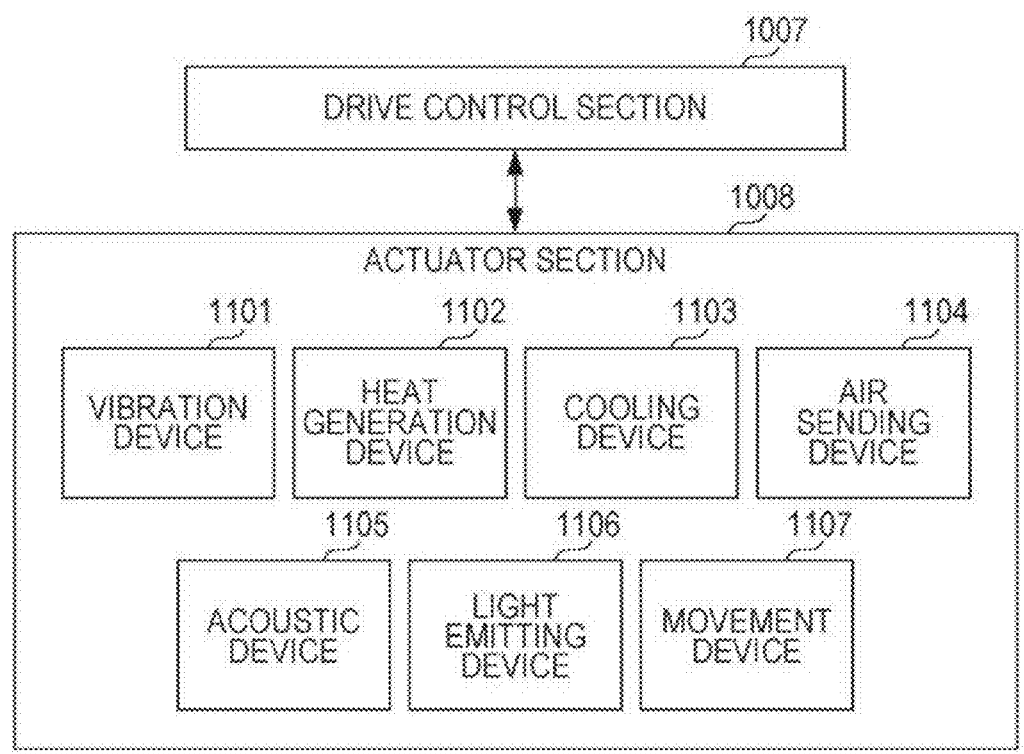
FIG. 11 is a diagram schematically illustrating an example of a configuration of an actuator section.

FIG. 11 schematically illustrates an example of a configuration of the actuator section 1008. The actuator section 1008 includes at least some of output devices among a vibration device 1101, a heat generation device 1102, a cooling device 1103, an air sending device 1104, such as a fan, or the like, an acoustic device 1105, such as a speaker, or the like, a light emitting device 1106, and a movement device 1107. The control section 1001 is capable of controlling operation of the output devices 1101 to 1107 through the drive control section 1007. Then, the actuator section 1008 is capable of generating vibration, heat, cooling, outputting wind, sound, emitting light, outputting pulses, and the like in addition to displaying an image of a dangerous place. In the case where the actuator section 1008 includes a large variety of output devices, and a plurality of output devices are operated in combination, it is possible to present various kinds of feedback.

Next, a description will be given of processing operation for providing distribution services of information regarding a dangerous place in the information distribution system 100 according to the present embodiment. The information distribution services is roughly divided into an image acquisition phase in which each of the image capturing devices 110-1, 110-2, 110-3, . . . , obtains an image of a dangerous place, and an information providing phase in which the information management center 120 collects the images obtained by each of the image capturing devices 110-1, 110-2, 110-3, . . . , and classifies and provides the images to necessary information display devices 130-1, 130-2, 130-3, . . . .

Figure 12:
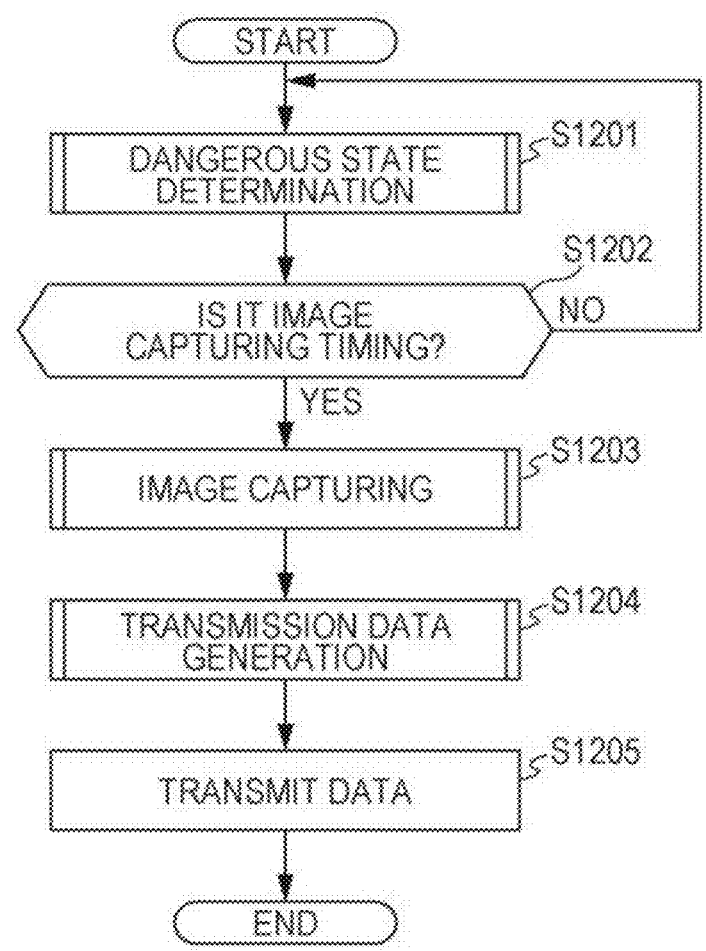
FIG. 12 is a flowchart illustrating a general processing procedure for capturing an image of a dangerous place, which is executed in each of the image capturing devices.

FIG. 12 is a flowchart illustrating a general processing procedure for capturing an image of a dangerous place, which is executed in each of the image capturing devices 110-1, 110-2, 110-3, . . . . Note that it is assumed that the image capturing devices 110-1, 110-2, 110-3, . . . , continue to obtain the current position and posture information all the time during the processing operation.

In the image capturing device 110, a determination is made as to whether the device 110 or the user thereof is in a dangerous state or not (step S1201). In this step, for example, the level of a danger is output as an index value, such as a degree of danger, or the like.

Next, a determination is made as to whether it is timing to capture an image of a dangerous place on the basis of the current degree of danger of the device 110 or the user thereof (step S1202). Here, if the degree of danger of the device 110 or the user thereof is high, a determination is made that the image capture timing has come (Yes in step S1202), and the image capturing device 110 executes capturing of a moving image or a still image using the outside camera 612 at the current position (step S1203).

Then, the image capturing device 110 generates transmission data by adding the current position and posture information to the image of the dangerous place captured in step S1203 (step S1204), and transmits the image and the information to the information management center 120 through the communication section 605 (step S1205).

In this regard, in step S1204, the image capturing device 110 may generate the transmission data by adding image-captured time information, a user-ID of the user of the image capturing device 110, or user attribute information in addition to the current position and posture information. Also, the image capturing device 110 may further add the dangerous state information used for the determination of a danger in step S1201, or an information tag for determining the type of a danger in addition to the transmission data.

Figure 13:
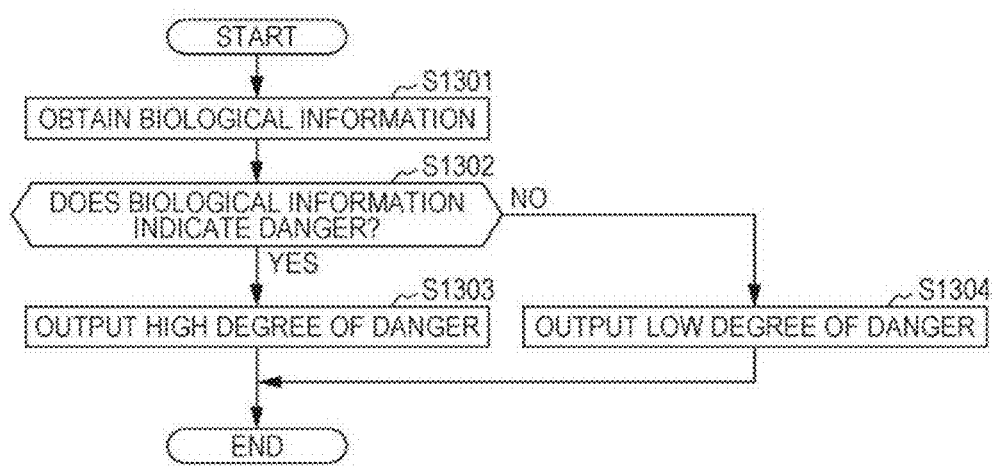
FIG. 13 is a flowchart illustrating determination processing of a dangerous state, which is executed by the image capturing device in step S1201.

FIG. 13 is a flowchart illustrating determination processing of a dangerous state, which is executed by the image capturing device 110 in step S1201.

The control section 601 obtains biological information, such as pulse, perspiration, myoelectric potential, movement of eyeball, and the like from the state information acquisition section 604 (S1301). Then, the control section 601 automatically determines whether the obtained biological information indicates that the user has encountered a dangerous place or not (step S1302).

When physiological phenomena in which a user is in a state of extreme tension is detected from biological information, for example, when the heart rate has abruptly increased, perspiration has been detected, muscle has abnormally contracted, eyes keep going out of focus or keep a close watch on one place, or the like, it is possible for the control section 601 to determine that the user has encountered a dangerous place. In this regard, it is possible to perform component analysis on sweat so as to identify the sweating is caused by body temperature regulation or tension in order to increase determination precision. Also, in step S1302, more advanced and complicated determination processing, for example, to what extent, is it dangerous relatively, or the like may be performed in place of binary determination of whether it is dangerous or not by comparison of biological information with a threshold value. In order to perform such advanced and complicated determination processing, it is necessary to have a large amount of data, or a massive calculation load is imposed, and thus it is assumed to be difficult for the image capturing device 110 configured as a head mounted display to achieve the determination processing alone. Accordingly, cloud technology provides services that provide information on the relative degree of danger indicated by biological information based on a large amount of recorded data, and the control section 601 may use the information provided from such services.

Also, the control section 601 may perform determination processing in step S1302 in consideration of acceleration information together with the biological information. When a high acceleration or speed was imposed on the image capturing device 110 or the user, and then the heart rate has abruptly increased, it is possible to determine that a minor incident has occurred because the user stumbled on an obstacle or a hollow on the road.

Then, if determined that the user has encountered a dangerous place (Yes in step S1302), the control section 601 outputs a higher degree of danger on the basis of the pulse rate of the user or the amount of perspiration or the components of sweat, or the like at that time (step S1303). On the other hand, if determined that the user is not in a dangerous place (No in step S1302), the control section 601 outputs a low degree of danger on the basis of the pulse rate of the user or the amount of perspiration or the components of sweat, or the like (step S1304).

In this regard, in this processing routine, information of a dangerous state used for determination of a danger, or an information tag for determination of a danger type may be output in addition.

Figure 14:
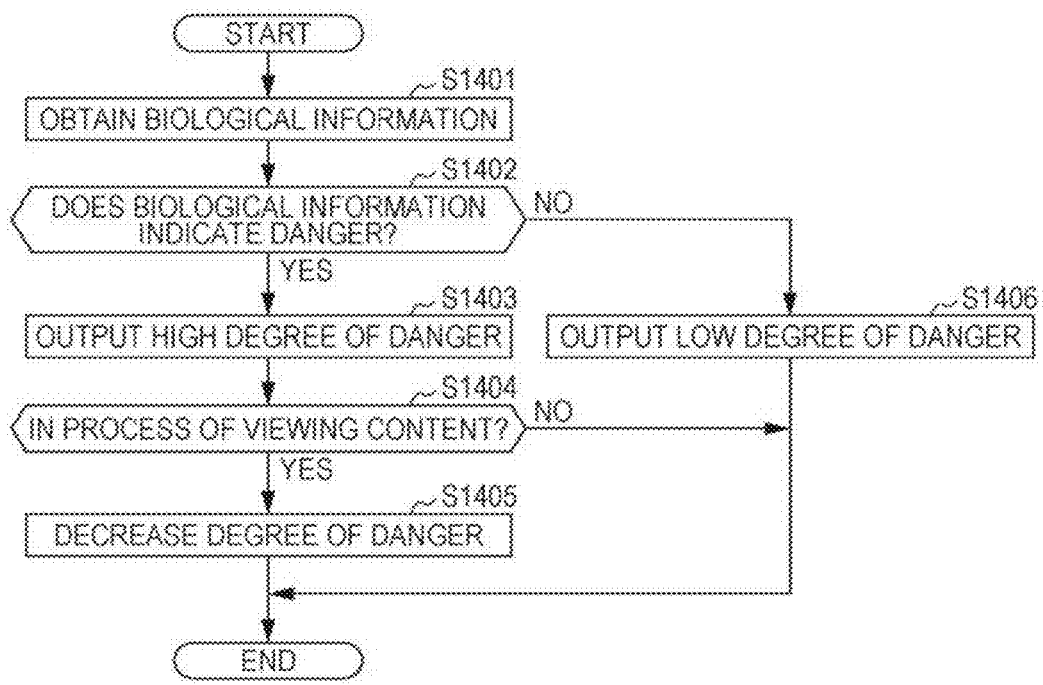
FIG. 14 is a flowchart illustrating a variation of the determination processing of a dangerous state, which is executed by the image capturing device in step S1201.

FIG. 14 is a flowchart illustrating a variation of the determination processing of a dangerous state, which is executed by the image capturing device 110 in step S1201. In the present embodiment, the image capturing device 110 is configured as a head mounted display, and it is possible for the user to view a content, such as a movie, or the like by the head mounted display. Accordingly, the user sometimes has been emotionally involved in a viewing content, and as a result, a change may occur in the biological information, such as the pulse rate, the perspiration, and the like. This might bring about an erroneous determination of a dangerous state. Thus, the processing procedure in FIG. 14 is different from the processing procedure illustrated in FIG. 13 in the point that determination of the degree of danger is changed depending on whether the user is viewing a content or not.

The control section 601 obtains biological information, such as pulse, perspiration, myoelectric potential, movement of eyeball, and the like from the state information acquisition section 604 (S1401). Then, the control section 601 automatically determines whether the obtained biological information indicates that the user has encountered a dangerous place or not (step S1402).

Here, if the control section 601 determines that the user is not at a dangerous place from the biological information (No in step S1402), the control section 601 outputs a low degree of danger in accordance with the biological information, such as the pulse rate of the user at that time, the amount of perspiration, or the component of sweat, and the like (step S1406).

On the other hand, if the control section 601 determines that the user has encountered a dangerous place on the basis of the biological information (Yes in S1402), the control section 601 temporarily sets a higher degree of danger (step S1403), and then further determines whether the user is viewing a content at that time or not (step S1404).

If the user is not viewing a content (No in step S1404), the control section 601 directly outputs a higher degree of danger. On the other hand, if the user is viewing a content (Yes in step S1404), a change of the user's biological information is a result of emotional involvement in a viewing content. Accordingly, there is a possibility that a danger does not exist in reality, and thus the control section 601 decreases a degree of danger, and outputs the degree of danger (step S1405).

In this regard, in this processing routine, the control section 601 may output information of a dangerous state used for determination of a danger, or an information tag for determining the type of the danger (as described above).

Figure 15:
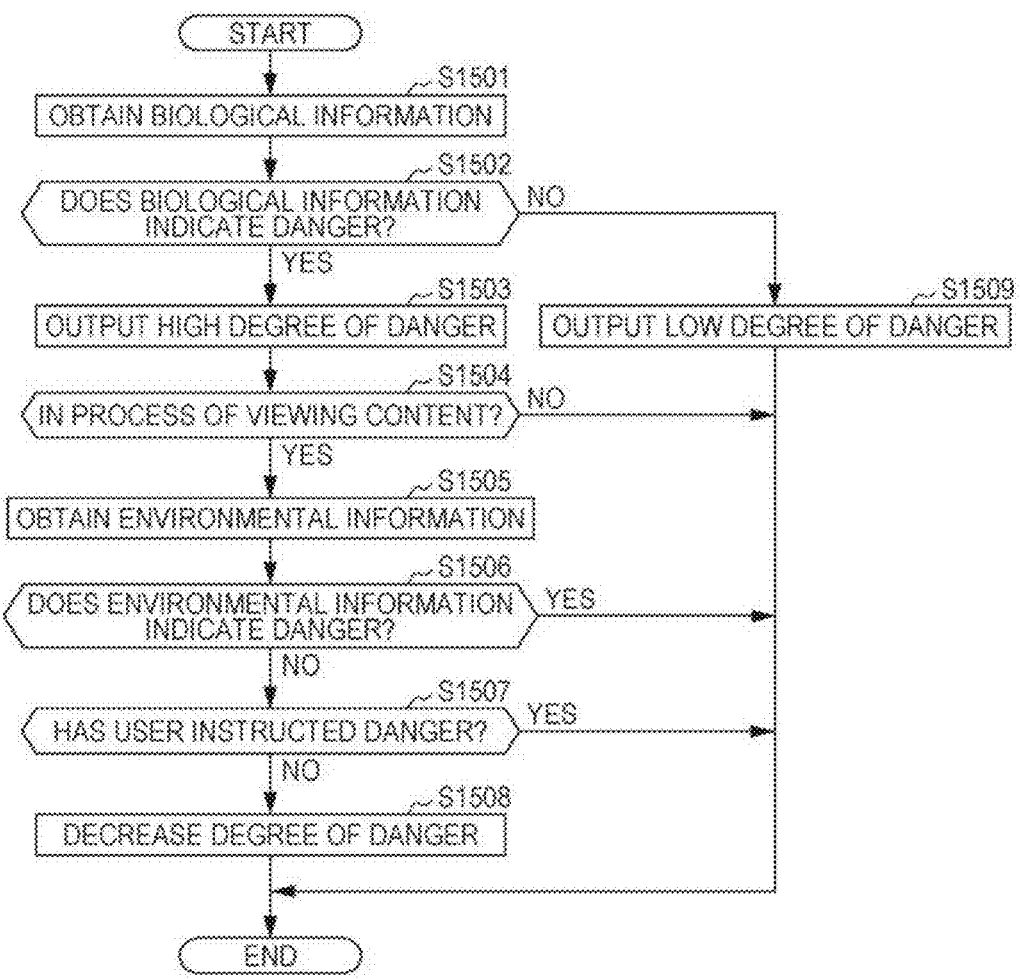
FIG. 15 is a flowchart illustrating another variation of the determination processing of a dangerous state, which is executed by the image capturing device in step S1201.

Also, FIG. 15 is a flowchart illustrating another variation of the determination processing of a dangerous state, which is executed by the image capturing device 110 in step S1201. In the determination processing illustrated in FIG. 14, the impact on a change in biological information, which is accompanied by the user viewing a content is removed. However, whether a change in the user's biological information is due to a danger that occurred in a real world or viewing a content is still unclear. Thus, in the processing procedure illustrated in FIG. 15, a determination of a degree of danger is made further in consideration of the environmental information of the image capturing device 110 or the user with higher precision.

The control section 601 obtains biological information, such as pulse, perspiration, myoelectric potential, movement of eyeball, and the like from the state information acquisition section 604 (S1501). Then, the control section 601 automatically determines whether the obtained biological information indicates that the user has encountered a dangerous place or not (step S1502).

Here, if the control section 601 determines that the user is not at a dangerous place from the biological information (No in step S1502), the control section 601 outputs a low degree of danger in accordance with the pulse rate of the user at that time, the amount of perspiration, or the components of sweat, and the like (step S1509).

On the other hand, if the control section 601 determines that the user has encountered a dangerous place on the basis of the biological information (Yes in S1502), the control section 601 temporarily sets a higher degree of danger (step S1503), and then further determines whether the user is viewing a content at that time or not (step S1504).

If the user is not viewing a content (No in step S1504), the control section 601 directly outputs a higher degree of danger. On the other hand, if the user is viewing a content (Yes in step S1504), there is a possibility that a change of the user's biological information is a result of emotional involvement in a viewing content. Thus, the control section 601 obtains information on the environment in which the image capturing device 110 or the user is placed from the environmental information acquisition section 616 (step S1505), and automatically determines whether the environmental information indicates that the user has encountered a dangerous place (step S1506).

For example, if the control section 601 has determined, from the obtained environmental information, that a big sound, such as noises, an explosive sound, or the like was detected, that a strong wind, such as a storm, an air blast, or the like was detected, that a high temperature like a fire location, such as a fire site, a vehicle collision accident, or the like was detected, an atmosphere (for example, there is a thick fog or smoke, radioactive rays, and a toxic chemical substance in the atmosphere), or the like is detected, it is possible to determine that the user has encountered a dangerous place. Also, when it is recognized that the user is at a site of an accident, an incident, or the like by analyzing the image captured by the outside camera 612, it is possible to determine that the user has encountered a dangerous place.

Here, if the control section 601 has determined that the user encountered a dangerous place on the basis of the environmental information (Yes in step S1506), the control section 601 directly outputs a higher degree of danger. Also, even if a determination is made that the user did not encounter a dangerous place on the basis of the environmental information (No in step S1506), when the user inputs an instruction stating that it is dangerous through the input operation section 602, a remote control, or the like (Yes in step S1507), the control section 601 directly outputs a higher degree of danger.

On the other hand, if a determination is made that the user did not encounter a dangerous place on the basis of the environmental information (No in step S1506), and the user did not input an instruction stating that it is a dangerous place (No in step S1507), the control section 601 has determined that the image capturing device 110 or the user did not encounter a dangerous place, reduces the degree of danger, and then outputs the degree of danger (step S1508).

In this regard, in this processing routine, the control section 601 may output information of the dangerous state used for determination of a danger, or the information tag for determining the type of the danger (as described above).

If a person encounters a phenomenon, such as a sound, that causes the person to predict a danger (for example, an engine sound of an automobile approaching rapidly, a brake squeal, a car horn, headlight, wind (abrupt movement of air), vibration, and the like), the person automatically gives his/her line of sight to that direction. Then, when the person witnesses the phenomenon, that is to say, a dangerous state, his/her experiences a biological change, such as an increase in pulse, and perspiration. Accordingly, it is possible to correctly determine a degree of danger with high precision using the person's behavioral characteristic and physiological phenomena.

Figure 23:
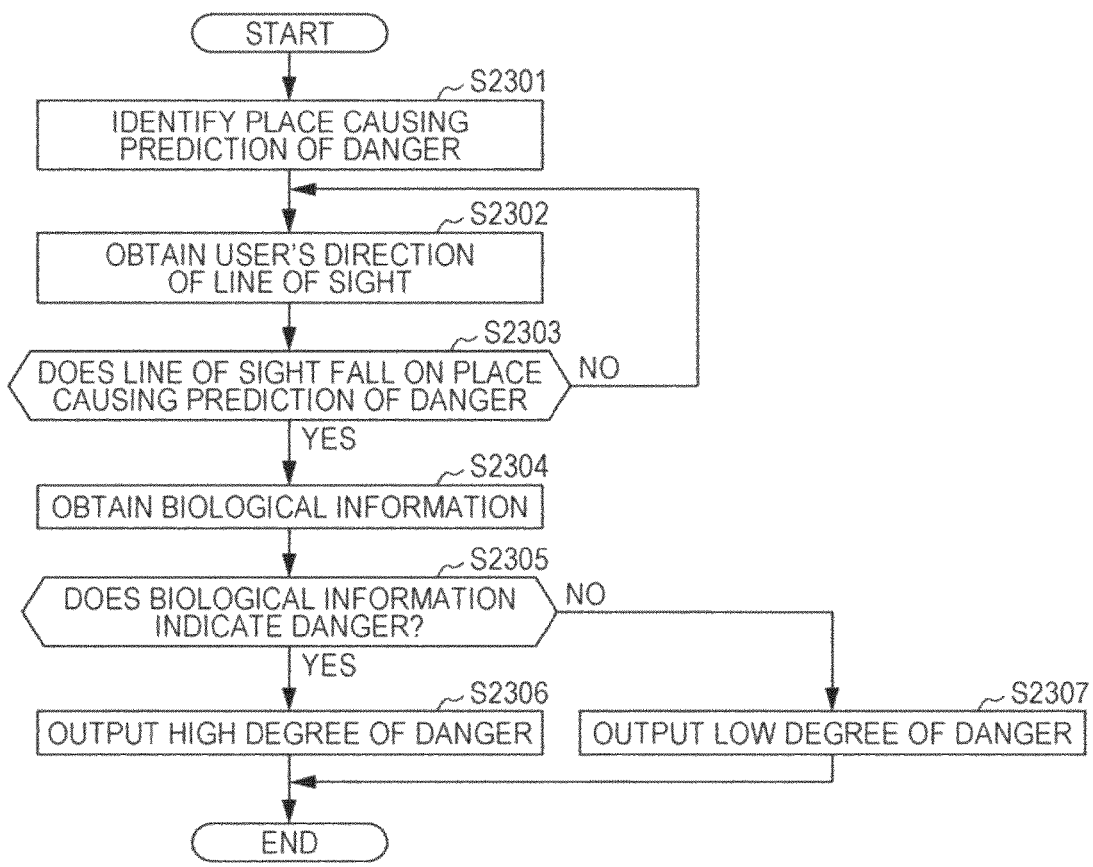
FIG. 23 is a flowchart illustrating a processing procedure for determining a dangerous state using behavior characteristic and physiological phenomena of a person.

FIG. 23 is a flowchart illustrating a processing procedure for determining a dangerous state using behavior characteristic and physiological phenomena of a person.

First, the control section 601 identifies a place where the user of the image capturing device 110 predicts a danger (step S2301).

In step S2301, the control section 601 identifies a place that causes the user to predict a danger on the basis of the environmental information obtained from the environmental information acquisition section 616. Specifically, the control section 601 identifies a sound source of a big sound, a windward, such as air blast, or the like, a light source of strong light, a source of vibration, and the like.

Next, the control section 601 extracts information on the user's position and posture information and the line of sight from the biological information (for example, electro oculograpy, and at least one of the images of left and right eyes, captured by the inside camera) received from the state information acquisition section 604, and obtains the direction of line of sight (step S2302).

Then, the control section 601 checks whether the user's line of sight falls on (or substantially falls on) the place identified in step S2301 to predict a danger (step S2303).

Here, if the user's line of sight falls on (or substantially falls on) the place identified in step S2301 to predict a danger (Yes in step S2303), the control section 601 further obtains biological information, such as pulse, perspiration, myoelectric potential, movement of eyeball, and the like from the state information acquisition section 604 (S2304). Then, the control section 601 automatically determines whether the obtained biological information indicates that the user has encountered a dangerous place or not (step S2305).

When physiological phenomena such that a user is in a state of extreme tension is detected from biological information, for example, heart rate has abruptly increased, perspiration has been detected, muscle has abnormally contracted, eyes keep going out of focus or keep a close watch on one place, or the like, it is possible for the control section 601 to determine that the user has encountered a dangerous place. In this regard, it is possible to perform component analysis on sweat so as to identify the sweating is caused by body temperature regulation or tension in order to increase determination precision. Also, when a high acceleration or speed was imposed on the image capturing device 110 or the user, and then the heart rate has abruptly increased, it is possible to determine that a minor incident has occurred because the user stumbled on an obstacle or a hollow on the road.

Then, if determined that the user has encountered a dangerous place (Yes in step S2305), the control section 601 outputs a higher degree of danger on the basis of the pulse rate of the user or the amount of perspiration or the components of sweat, or the like at that time (step S2306). On the other hand, if determined that the user is not in a dangerous place (No in step S2305), the control section 601 outputs a low degree of danger on the basis of the pulse rate of the user or the amount of perspiration or the components of sweat, or the like (step S2307).

In this regard, in this processing routine, the control section 601 may output information of a dangerous state used for determination of a danger, or an information tag for determining the type of the danger (as described above).

As described above, it is possible to correctly determine whether the user has encountered a dangerous place in combination of the user's biological information, the viewing state of a content, and the environmental information in which the image capturing device 110 or the user is in. Also, the image capturing device 110 is configured as a head mounted display, and is used by being worn on the head of the user, and thus it is possible to automatically capture an image in the user's direction of line of sight using the outside camera 612. However, a user who has encountered a dangerous place does not necessarily continue to watch the dangerous place. Accordingly, there is a possibility that an image of a thing not related to a danger at all is captured, and is transmitted to the information management center 120. Thus, the image capturing device 110 may determine whether the user is watching a dangerous place on the basis of the user's biological information obtained by the state information acquisition section 604, or the environmental information obtained by the environmental information acquisition section 616, or the like, and may perform image capturing operation.

Figure 16:
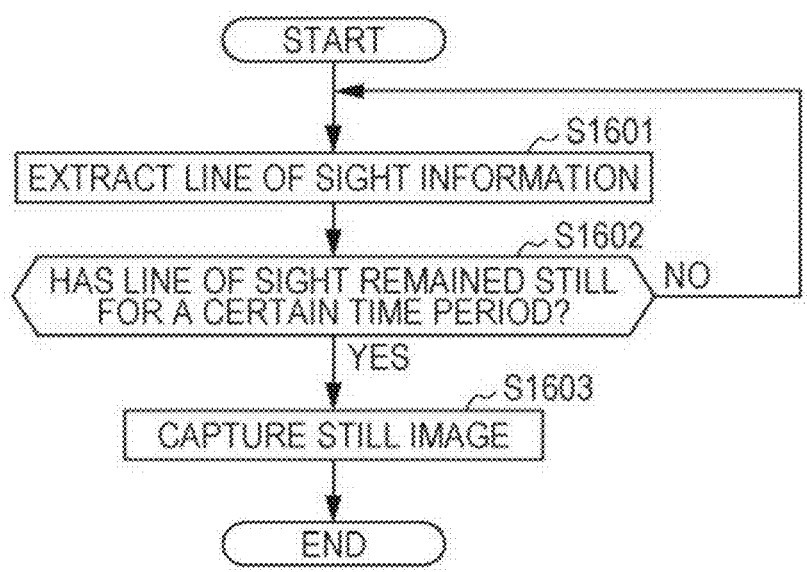
FIG. 16 is a flowchart illustrating a processing procedure for capturing an image of a dangerous place, which is executed by the image capturing device in step S1203.

FIG. 16 is a flowchart illustrating a processing procedure for capturing an image of a dangerous place, which is executed by the image capturing device 110 in step S1203. Note that it is assumed that a still image of a dangerous place is captured in the processing procedure illustrated in FIG. 16.

The control section 601 extracts the user's position and posture information and the line-of sight information from the biological information received from the state information acquisition section 604 (step S1601).

Next, the control section 601 checks whether the user's line of sigh remains at the same place for a certain period of time or not (step S1602).

Then, if it is detected that the user's line of sight remained at the same place for a certain period of time (Yes in step S1602), it is estimated that the user gazes at an accident site, an incident site, or a place where a minor incident has occurred. Accordingly, the control section 601 cause the outside camera 612 to direct to the user's direction of line of sight, and to capture a still image (step S1603).

Figure 17:
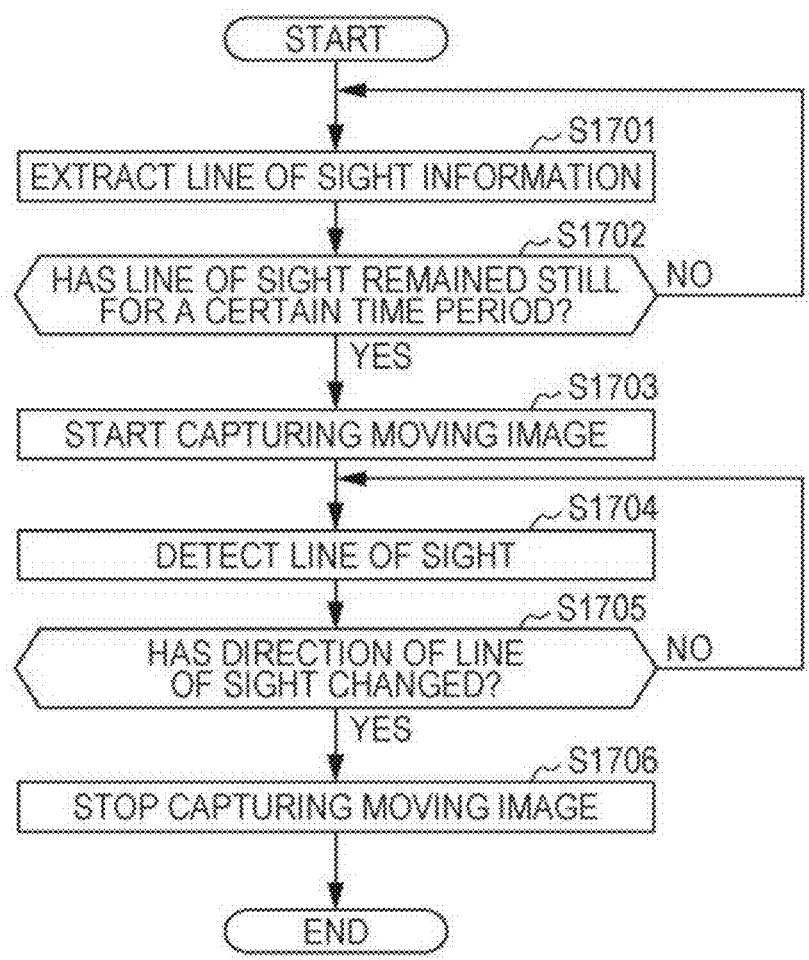
FIG. 17 is a flowchart illustrating another processing procedure for capturing an image of a dangerous place, which is executed by the image capturing device in step S1203.

Also, FIG. 17 is a flowchart illustrating another processing procedure for capturing an image of a dangerous place, which is executed by the image capturing device 110 in step S1203. Note that it is assumed that a moving image of a dangerous place is captured in the processing procedure illustrated in FIG. 17.

The control section 601 extracts the user's position and posture information and line-of-sight information from the biological information received from the state information acquisition section 604 (step S1701).

Next, the control section 601 checks whether the user's line of sight remained at the same place for a certain period of time (step S1702).

Then, if it is detected that the user's line of sight remained at the same place for a certain period of time (Yes in step S1702), it is estimated that the user gazes at an accident site, an incident site, or a place where a minor incident has occurred. Accordingly, the control section 601 cause the outside camera 612 to direct to the user's direction of line of sight, and to start capturing a moving image (step S1703).

After that, the control section 601 continues to detect the user's line of sight while capturing the image (step S1704). Then, if the user's direction of line of sight changes a certain amount or more (Yes in step S1705), it is estimated that the user's line of sight falls off the accident site, the incident site, or minor incident place, and thus the control section 601 stops capturing the moving image (step S1706).

Figure 18:
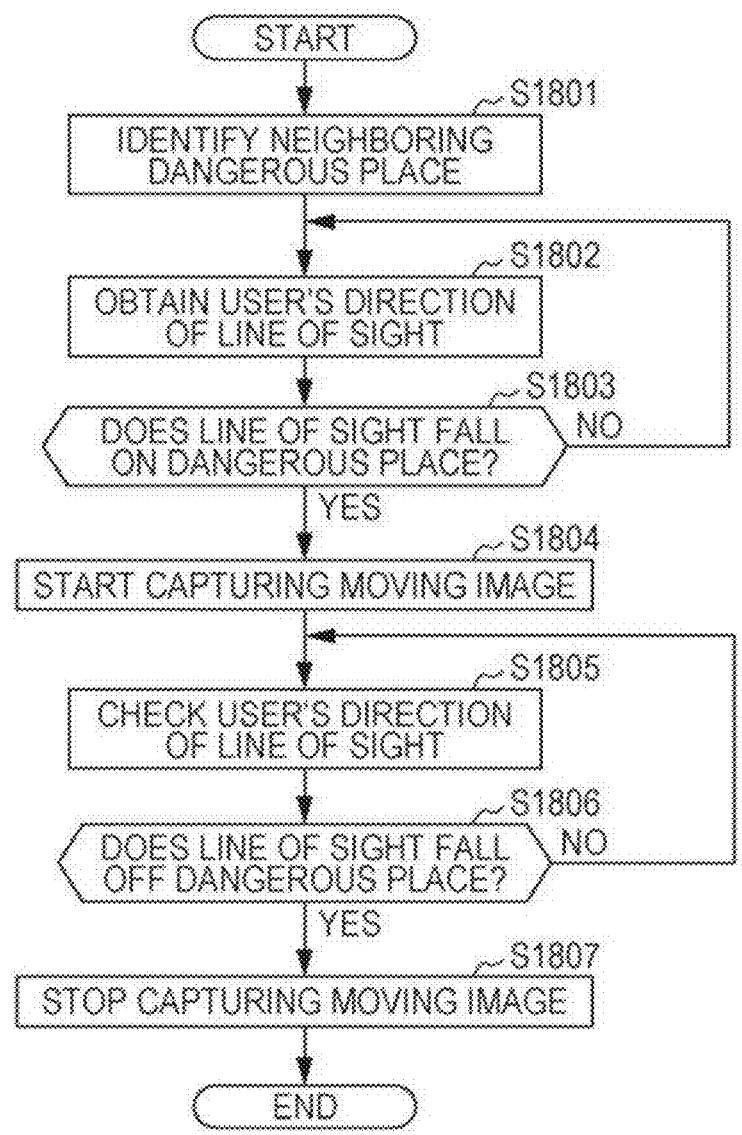
FIG. 18 is a flowchart illustrating still another processing procedure for capturing an image of a dangerous place, which is executed by the image capturing device in step S1203.

FIG. 18 is a flowchart illustrating still another processing procedure for capturing an image of a dangerous place, which is executed by the image capturing device 110 in step S1203. In the processing procedure illustrated in FIG. 16 and FIG. 17, a determination as to whether the user watched only a dangerous place or not is made only by the direction of line of sight. In contrast, the processing procedure illustrated in FIG. 18 is different from the above in the point that a dangerous place is identified on the basis of the environmental information, and the like that is obtained by the environmental information acquisition section 616. Also, in the processing procedure illustrated in FIG. 18, it is assumed that a moving image of a dangerous place is captured.

First, the control section 601 identifies a dangerous place in the vicinity of the image capturing device 110 or the user (step S1801).

In step S1801, the control section 601 identifies the dangerous place on the basis of the environmental information obtained from the environmental information acquisition section 616, for example. Specifically, the control section 601 identifies a dangerous place, for example, a sound source of a big sound, such as a noise or an explosive sound, a windward of a strong wind, such as a storm or an air blast, or the like, a fire site based on temperature distribution or a fire location of a vehicle collision accident, or the like, an occurrence place of a thick fog or smoke, a source of radioactive rays, a source of toxic chemical substance, and the like. Also, the control section 601 may identify the image captured by the outside camera 612, and identifies a dangerous place, such as a site of an accident or an incident, or the like, a site of a minor incident, or the like.

Alternatively, the control section 601 may receive information on an accident or an incident that has occurred in the vicinity, and the like from the outside through the communication section 605, and may identify a neighboring dangerous place on the basis of the received information.

Next, the control section 601 extracts information on the user's position and posture information and line of sight from the biological information (for example, electro oculograpy, and at least one of the images of left and right eyes, captured by the inside camera) received from the state information acquisition section 604, and obtains the direction of line of sight (step S1802).

Then, if the user's line of sight falls on (or substantially falls on) the dangerous place identified in step S1801 (Yes in step S1803), the control section 601 starts capturing a moving image with the outside camera 612 directed to the user's direction of line of sight (step S1804).

After that, the control section 601 continues to detect the user's line of sight during an image capturing period (step S1805). Then, when the user's line of sight falls off the dangerous place (Yes in step S1806), the control section 601 stops capturing the moving image (step S1807).

Figure 19:
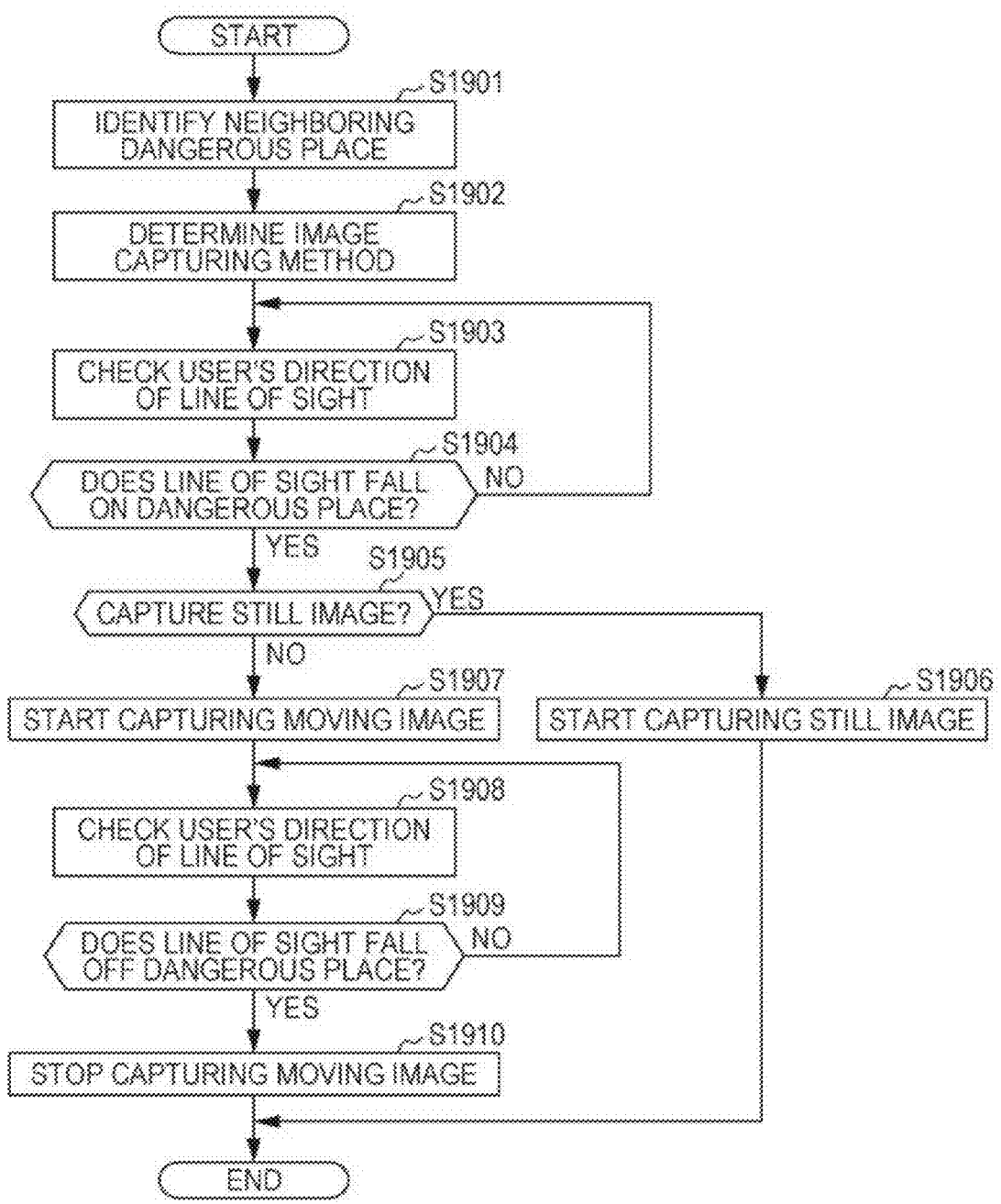
FIG. 19 is a flowchart illustrating still another processing procedure for capturing an image of a dangerous place, which is executed by the image capturing device in step S1203.

Also, FIG. 19 is a flowchart illustrating still another processing procedure for capturing an image of a dangerous place, which is executed by the image capturing device 110 in step S1203. In the processing procedure illustrated in FIG. 19, a dangerous place is identified on the basis of the environmental information obtained by the environmental information acquisition section 616, and the like in the same manner as the processing procedure illustrated in FIG. 18. However, the processing procedure illustrated in FIG. 19 is different in the point that whether a moving image or a still image is captured depends on the level of importance of a dangerous place or its type. This brings about advantages in that when an important accident or incident occurs, or in the case where a still image fails to convey the state of a dangerous place, it is possible to provide a moving image, and in the other cases, it is possible to reduce the amount of transmission data by providing a still image.

First, the control section 601 identifies a dangerous place in the vicinity of the image capturing device 110 or the user (step S1901).

The method of identifying a dangerous place on the basis of the environmental information is the same as that described with reference to FIG. 18. At this time, the level of importance and the type of a danger of the identified place is determined together, and a determination is made as to the method of capturing an image, that is to say, whether a moving image or a still image is to be captured on the basis of the determination result (step S1902).

Next, the control section 601 extracts the user's position and posture information, and line-of-sight information from the biological information received from the state information acquisition section 604, and checks the direction of line of sight (step S1903).

Then, if the user's line of sight falls on (or substantially falls on) the dangerous place identified in step S1901 (Yes in step S1904), the control section 601 captures an image.

Here, if it is determined to capture a still image in step S1902 (Yes in step S1905), the outside camera 612 is directed to the user's direction of line of sight, captures a still image (step S1906), and then this processing routine is terminated.

On the other hand, if determined to capture a moving image in step S1902 (No in step S905), the control section 601 directs the outside camera 612 to the user's direction of line of sight, and starts capturing a moving image (step S1907). Also, the control section 601 continues to detect the user's line of sight during an image capturing period (step S1908). Then, if the user's direction of line of sight falls off the accident site, the incident site, or, the place of the minor incident (Yes in step S1909), the control section 601 stops capturing the moving image (step S1910), and terminates this processing routine.

For example, if a pedestrian encounters an engine sound of an automobile approaching rapidly, a brake squeal, a car horn, headlight, wind (abrupt movement of air), vibration, and the like, the person automatically gives his/her line of sight to that direction. If the pedestrian is wearing a head mounted display as an image capturing device 110, it is possible for the pedestrian to immediately catch a state in the pedestrian's direction of line of sight in accordance with the above-described processing procedure (without the pedestrian being conscious of), and to capture the image of a dangerous place. That is to say, with a technique disclosed in this specification, it is possible for a person who happens to be at a dangerous place to capture an image in a situation where a danger is approaching. On the other hand, although it is possible to use a multifunctional terminal with a camera carried by a pedestrian, such as a smart phone, or the like to use an image capturing device 110, it becomes necessary for the pedestrian to take a conscious action or operation to direct a camera to the viewing direction in order to capture the image of the dangerous place in the same situation. Accordingly, it is difficult for the pedestrian to immediately take a reflective action. Also, if the pedestrian carries the multifunctional terminal in a pocket of clothes or in a bag, it is difficult to immediately correspond to the situation where a danger occurs or when encountering a dangerous place (or it is necessary to prepare in advance all the time), and thus the pedestrian is liable to lose an image capturing timing at an important situation.

With the image capturing device 110 configured as a head mounted display, it is possible to capture an image in a situation where a danger is approaching. However, it is possible to make a determination of a degree of danger with a further higher precision. For example, it is possible to determine an approaching objet, such as an automobile, a motorcycle, a bicycle, and the like. When a moving image is captured, it is possible to calculate an approaching speed of an object. Also, after collision, it is possible to determine the damage on the basis of the acceleration imposed by the collision. Also, when accidents frequently occurred, or when accidents nearly happened, but were prevented (only an increase in the heart rate, but no damage by the collision or the like), it is possible to determine from what point it is really dangerous, and to provide analysis information for the improvement.

Also, when the image capturing device 110 is configured as a head mounted display, it is possible to identify a degree of danger from the viewpoint of each user who wears the device. For example, it is difficult for a child to go near an approaching car, but for a tall adult, it is sometimes not dangerous. Also, an obstacle or a hollow on the sidewalk is not so dangerous for a person with good eyesight, but is dangerous for a person with poor eyesight. The same dangerous place has a different degree of danger depending on attributes, such as an age, gender, a physical characteristic, a character, and the like. It is possible for the image capturing device 110 as a head mounted display to obtain an image of a dangerous place in consideration of an age, gender, a physical characteristic, a character, and the like on the basis of a change in biological information based on the viewpoint of each user.

To date, there have been cameras capable of capturing dangerous scenes that occur at street corners, such as a monitoring camera, a security camera. However, these fixed-point cameras are disposed at danger zones that are mainly notorious places so far. However, it is rare that these fixed-point cameras are disposed at latent danger zones (to put it another way, places that are unclear as to whether a danger occurs or not). It costs too much to dispose fixed-point cameras at latent danger zones in terms of installation of the facilities. In contrast, with the technique disclosed in this specification, the image capturing device 110 is an imaging device that is carried by the user as a head mounted display, and thus it is possible to solve the inconvenience not allowed to install the facilities.

In addition, with the information distribution system 100 that captures an image of a dangerous place on the assumption that a large number of users are wearing a head mounted display, unlike fixed-point cameras, it becomes possible to give a deterrent force to a criminal to commit a crime, and to improve public safety and security of the users.

Each of the image capturing devices 110-1, 110-2, 110-3, . . . , captures an image of a dangerous place in accordance with any one of the processing procedures illustrated in FIG. 16 to FIG. 19, then in the following step 1204, creates transmission data by adding the positional information of the site, and transmits the image and the data to the information management center 120. Also, to the transmission data, each image capturing device may further attach information, such as time of the encounter with the danger, information regarding an encountered danger category (an accident, an incident, or a minor incident) (or an information tag to be used for identifying a danger category), user attribute information including a personal attribute of the user (gender, an age, a character, an occupation, and the like), a behavioral attribute, and the like.

The information management center 120 manages images of the dangerous place that have been received from each of the image capturing devices 110-1, 110-2, 110-3, . . . , in association with the positional information. Also, the information management center 120 may classify the images provided from each of the image capturing devices 110-1, 110-2, 110-3, . . . , for each danger category as necessary, and may manage the images in association not only with the positional information, but also with the other information, such as the user attribute information (described above), and the like.

Figure 20:
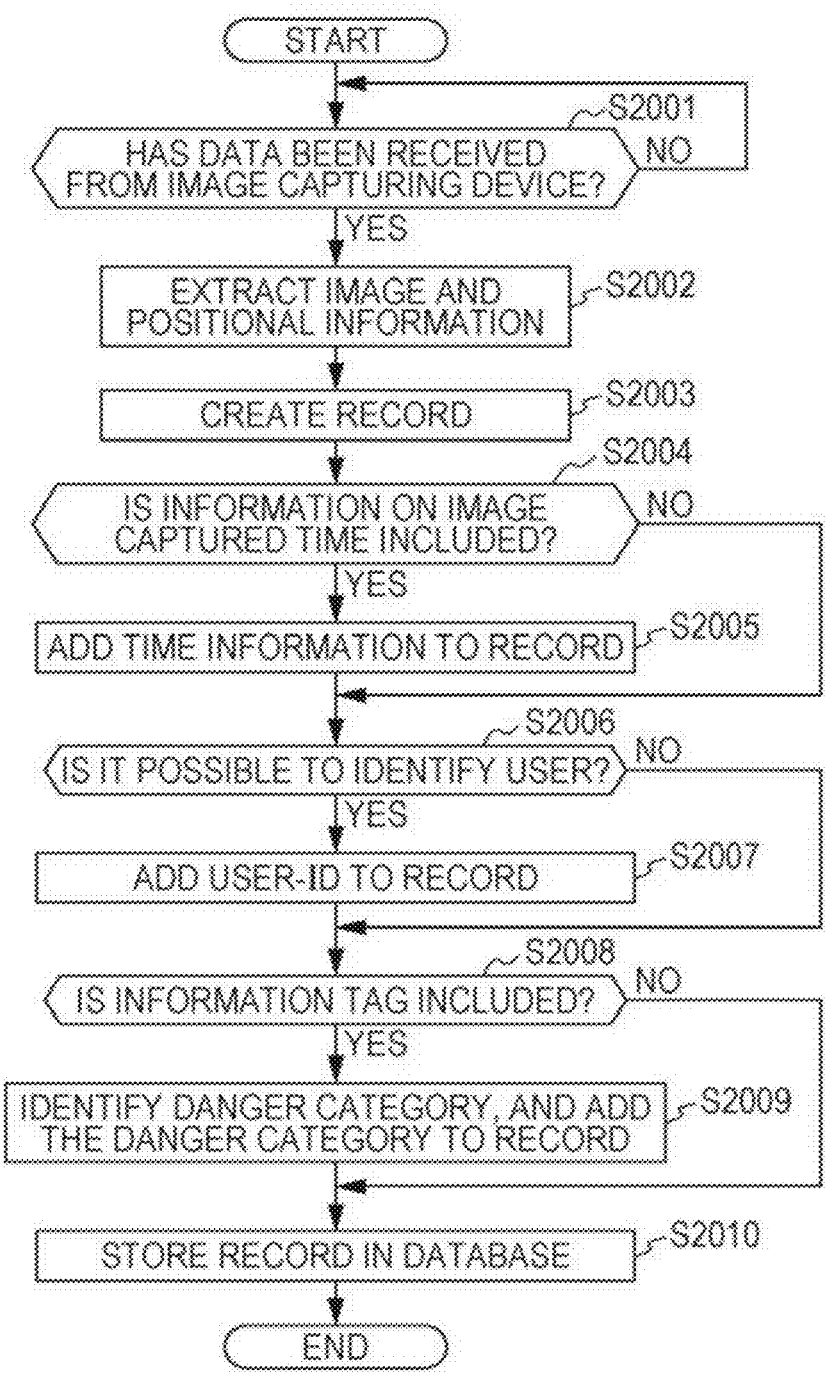
FIG. 20 is a flowchart illustrating a procedure for the information management center to process an image of a dangerous place received from the image capturing device.

FIG. 20 is a flowchart illustrating a procedure for the information management center 120 to process an image of a dangerous place received from each of the image capturing devices 110-1, 110-2, 110-3, . . . .

When the collected information analysis section 702 receives data from any one of the image capturing devices 110-1, 110-2, 110-3, . . . through the communication section 701 (Yes in step S2001), the collected information analysis section 702 analyzes received data, extracts the image of the dangerous place and the positional information of the site (step S2002), and creates a record including the image of the dangerous place and the positional information in association with each other (step S2003).

Next, the collected information analysis section 702 checks whether the received data includes information of the image captured time of the dangerous place (step S2004). If the information is included (Yes in step S2004), the collected information analysis section 702 adds the time information to the above-described record (step S2005).

Also, the collected information analysis section 702 checks whether it is possible to identify a user of the image capturing device 110, which becomes the data transmission source (step S2006). The method of identifying the user includes a case where the transmission source address included in the received data and the user are managed uniquely, a case where the received data includes a user-ID, or the like. In the case where it is possible to identify the user (Yes in step S2006), the collected information analysis section 702 adds the user-ID of the user to the above-described record (step S2007).

Also, the collected information analysis section 702 checks whether the received data includes an information tag for identifying a danger category (step S2008). If the information tag is included (Yes in step S2008), the collected information analysis section 702 analyzes the information tag, identifies the danger category, and adds the danger category to the above-described record (step S2009).

Then, the collected information analysis section 702 stores the created record into the image database 704 (step S2010), and terminates this processing routine. The data structure of the record in the image database 704 is illustrated in FIG. 8.

It is possible for the information management center 120 to provide a hazard map service by mapping information of the dangerous places collected from a large number of image capturing devices 110-1, 110-2, 110-3, . . . onto a map. The information providing section 703 may create a hazard map by mapping information of dangerous places including all the danger categories onto the map. Alternatively, the information providing section 703 may create a hazard map for each danger category (for example, a hazard map of traffic accidents, a hazard map of fires, a hazard map of sexual molestation or assault incidents, and the like).

Also, the information management center 120 may distribute the created hazard map to each of the information display devices 130-1, 130-2, 130-3, . . . , or may upload and publish the hazard map on an image sharing site.

As already described, images are collected from the individual image capturing devices 110-1, 110-2, 110-3, . . . , with identification of a degree of danger in accordance with a viewpoint of each user. Thus, in the information management center 120, it is possible for the information providing section 703 to provide a higher-precision hazard map that is customized to each of the user's attributes, such as an age, gender, a physical characteristic, a character, and the like. For example, it is possible to achieve delicate services suited to a difference of attribute for each user as follows.

(1) When an infant is conveyed in a baby carriage, it may be dangerous at a gap between a sidewalk and a road, because a contact with a car is liable to occur.

(2) Little children or short elementary school kids are liable to encounter a danger of being touched on a face or an eye by a smoking cigarette by a smoking person while walking. A place where an unspecified large number of people are crossing, such as busy streets in front of a station, a pedestrian crossing at an intersection, and the like may be dangerous.

(3) For short little children and elementary school kids, a deserted place may be dangerous, because they are liable to be annoyed by a kidnapper, a homeless person, and a suspicious person.

(4) Men may want to learn where they are liable to have trouble with a gangster.

(5) Young women may want to learn where they are liable to encounter a sexual molester.

(6) Regardless of age and gender, people may want to learn where is a conflict area of gangs, and where traffic accidents occurs frequently.

Also, the information management center 120 searches the image database 704 with a current position of each of the information display devices 130-1, 130-2, 130-3, . . . , and if a matched dangerous place is found, the information management center 120 transmits the captured image of that site, or the information regarding the dangerous place obtained by the image analysis to the corresponding information display device 130.

Figure 21:
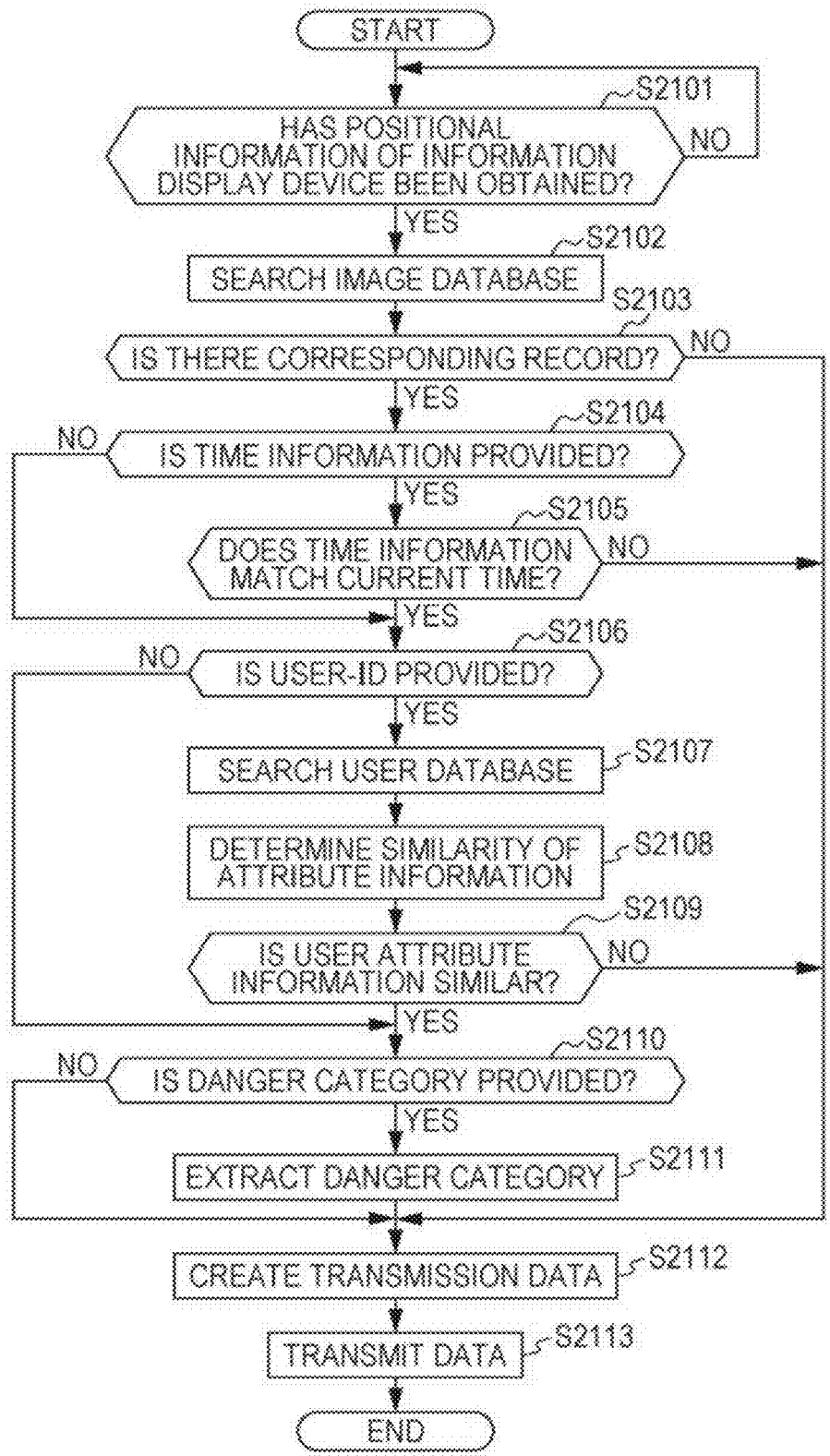
FIG. 21 is a flowchart illustrating a processing procedure for the information management center to transmit an image of a dangerous place or information thereof to the information display device.

FIG. 21 is a flowchart illustrating a processing procedure for the information management center 120 to transmit an image of a dangerous place or the information thereof to each of the information display devices 130-1, 130-2, 130-3, . . . .

The information providing section 703 attempts to obtain the positional information of each of the information display devices 130-1, 130-2, 130-3, . . . (step S2101).

The method of obtaining the positional information of the information display device 130 is not limited in particular. The information management center 120 sometimes monitors the information on the current position of each of the information display devices 130-1, 130-2, 130-3, . . . , all the time. Also, an information display device 130 that requests information on a dangerous place sometimes transmits the positional information of itself.

When it was possible for the information providing section 703 to obtain the positional information of any one of the information display devices 130 (Yes in step S2101), the information providing section 703 searches the image database 704 using the positional information (step S2102).

If there are one or more records that match the positional information in the image database 704 (Yes in step S2103), filtering processing is performed as necessary.

Specifically, if time information is described in the corresponding record (Yes in step S2104), whether the time information of the record matches the current time or not is further checked (step S2105). The record having the time information that does not match the current time is handled as unmatched (No in step S2105).

Also, if a user-ID is described in the corresponding record (Yes in step S2106), a search is made of the user database 705 using the user-ID to extract the user's personal attribute and behavioral attribute (step S2107). Then, filtering is performed on the basis of the similarity to the personal attribute and the behavioral attribute of the user of the information display device 130 to be the transmission target of the image (step S2108).

The record including the image collected from the user whose personal attribute and behavioral attribute are not similar is handled as unmatched (No in step S2109). This is because there are sites that are dangerous to women, and but not to men, sites that are dangerous to infants or elderly people in particular, and there are cases where it is dangerous when running, but not dangerous in particular and unnecessary to pay attention when walking, and the like. Also, an obstacle or a hollow on the sidewalk is not so dangerous for a person with good eyesight, but is dangerous for a person with poor eyesight. If information is transmitted to a user who is not in danger, it becomes a useless warning, and thus information will not be accepted seriously in the case of a real danger.

Also, if a danger category is described in the corresponding record (Yes in step S2110), the danger category is extracted (step S2111).

Then, the information providing section 703 creates transmission data (step S2112). The data of the image remained after the filtering processing is included in the transmission data.

The transmission data may include the image data of a dangerous place itself, or the location storing the image data (image sharing site, or the like), or an URL or an URI that indicates the information to be accessed.

Also, the information providing section 703 may not include the image data extracted from the image database 704 directly in the transmission data, but may transmit the image data suitably processed in accordance with a device attribute, such as display ability of the information display device 130 of the transmission destination, or the user attribute, the danger category, and the like. For example, the information providing section 703 changes the resolution and the image size in accordance with whether the information display device 130 of the transmission destination is a head mounted display or a head up display. Also, if a user of the information display device 130 of the transmission destination is an adult, the information providing section 703 inserts a detailed message including Chinese characters, but if the user is a little child, the information providing section 703 inserts a message not including difficult Chinese characters, but including images that are easy to understand, such as pictorial symbols, or the like. Also, if a danger category is an urgent case, such as a traffic accident, a fire, or the like, the information providing section 703 promotes awareness of the user by displaying in a reddish color. If it is a place where a suspicious person frequently appears, the information providing section 703 urges the user to avoid approaching by displaying in a dark color. In this regard, a part of all of the above-described process processing of the image data may be performed by the information display device 130 of the transmission destination in place of the information management center 120.

On the other hand, if the record of the corresponding image is not found in the image database 704 (No in step S2103), or if there remains no image after the filtering processing (No in step S2105 or S2109), a description stating that there is no corresponding image is written into the transmission data in step S2112. Also, if a danger category is obtained in step S2111, the danger category may be included in the transmission data. The created transmission data is transmitted to the corresponding information display device 130 through the communication section 1002 (step S2113). In this regard, it is assumed that there are a plurality of records of the corresponding image as a result of the filtering processing on the basis of the time information and the user's attribute information. In such a case, it is thought that there are two methods of transmitting the data. One is a method in which the information management center 120 narrows down the records to one (or some of the records) to transmit the data to the information display device 130. The other is a method of transmitting all the corresponding images to the information display device 130. For the details, a description will be given later.

When each of the information display devices 130-1, 130-2, 130-3, . . . , receives an image of a dangerous place, or information regarding a dangerous place obtained by image analysis from the information management center 120, the information display device displays the image or the information so as to give a warning against a danger to the user who is carrying the device.

For example, if the information display device 130 is a head mounted display, or a head up display, information is displayed by being overlaid on a dangerous place in the visual range of the user so as to effectively notify the user of a danger in order to avoid the danger. Also, the information display device 130 may further call user's attention by giving sound output, such as sound effect, or the like, vibration, performing tactile feedback in addition at a time when displaying a captured image of a dangerous place.

Figure 22:
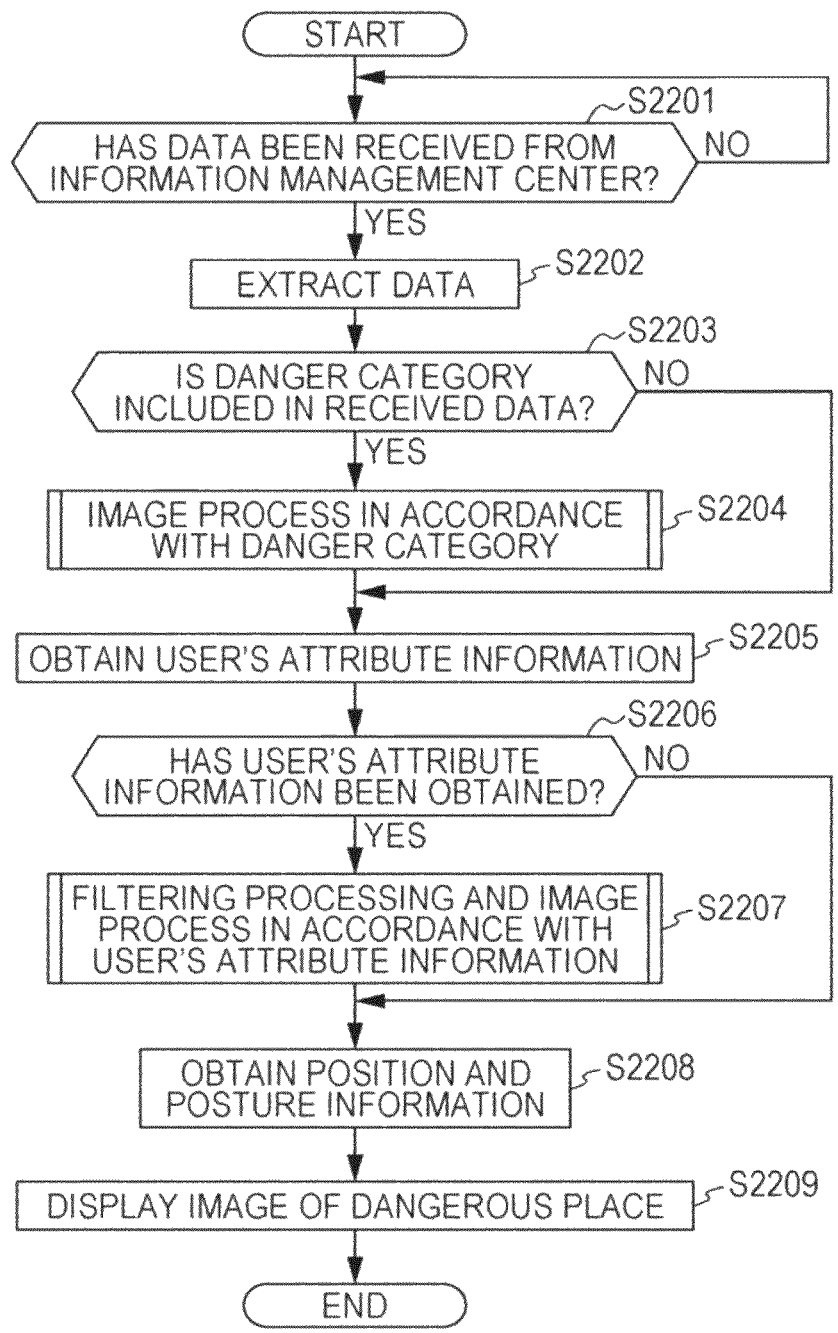
FIG. 22 is a flowchart illustrating a processing procedure for the information display device to display information regarding a dangerous place, received from the information management center, to a user.

FIG. 22 is a flowchart illustrating a processing procedure for the information display device 130 to display information regarding a dangerous place, received from the information management center 120, to a user. However, it is assumed that in the processing procedure in FIG. 22, a part of or all of the image filtering processing, and the process processing of the image data is performed by the information display device 130 in place of the information management center 120.

When the control section 1001 receives data from the information management center 120 by the communication section 1002 (Yes in step S2201), the control section 1001 decodes the received data, and extracts various data, such as the image of a dangerous, and the like (step S2202). In this regard, if the received data does not include the image of a dangerous place itself, but includes a URL or a URI, the image is downloaded from the corresponding image sharing site, or the like in step S2202. Also, it is assumed that information on a plurality of images regarding a dangerous place at which the user of the information display device 130 is present is transmitted from the information management center 120.

Next, the control section 1001 checks whether the received data includes a danger category or not (step S2203). If a danger category is included (Yes in step S2203), the control section 1001 performs processing on the image obtained in step S2202 in accordance with the danger category as necessary (step S2204). For example, if a danger category is an urgent case, such as a traffic accident, a fire, or the like, the control section 1001 promotes awareness of the user by displaying a dangerous place in a reddish color. Also, if it is a place where a suspicious person frequently appears, the control section 1001 urges the user to avoid approaching by displaying a dangerous place in a dark color.

Next, the control section 1001 attempts to obtain the user attribute information of the information display device 130 from the ROM 1001A, the user database 705, or the like (step S2205). Then, if it was possible to obtain the user attribute information (Yes in step S2206), the control section 1001 performs processing on the image obtained in step S2202 in accordance with the user's attribute information as necessary (step S2207). For example, if the user is an adult, the control section 1001 inserts a detailed message including Chinese characters, but if the user is a little child, the control section 1001 inserts a message not including difficult Chinese characters, but including images that are easy to understand, such as pictorial symbols, or the like. Also, if information on a plurality of images is transmitted from the information management center 120, the control section 1001 performs filtering processing in accordance with the time information, and the user's personal attribute and behavioral attribute in step 2207.

Then, when the positional information acquisition section 1003 obtains the current position and posture information of the user of the information display device 130 (step S2208), the control section 1001 displays the image of a dangerous place by following the user's head movement (step S2209). If the information display device 130 is, for example, a head mounted display or a head up display, the image of a dangerous place is displayed in a see-through manner so as to be overlapped on a dangerous place of a real scene. In this regard, if information on a plurality of images is transmitted from the information management center 120, it is assumed that even if filtering processing is performed in step S2207, it is difficult to narrow down the images to one image. For the details of the processing at that time, a description will be given later.

FIG. 24 to FIG. 27 illustrate a display example of an image of a dangerous place on a certain information display device 130. Note that in each of FIG. 24 to FIG. 27, it is assumed that the information display device 130 is configured as a head mounted display, or a head up display, and the image of a dangerous place is displayed in an overlapping manner on the scene (a street corner, or the like) in the direction of line of sight of the user of the corresponding device.

Figure 24:
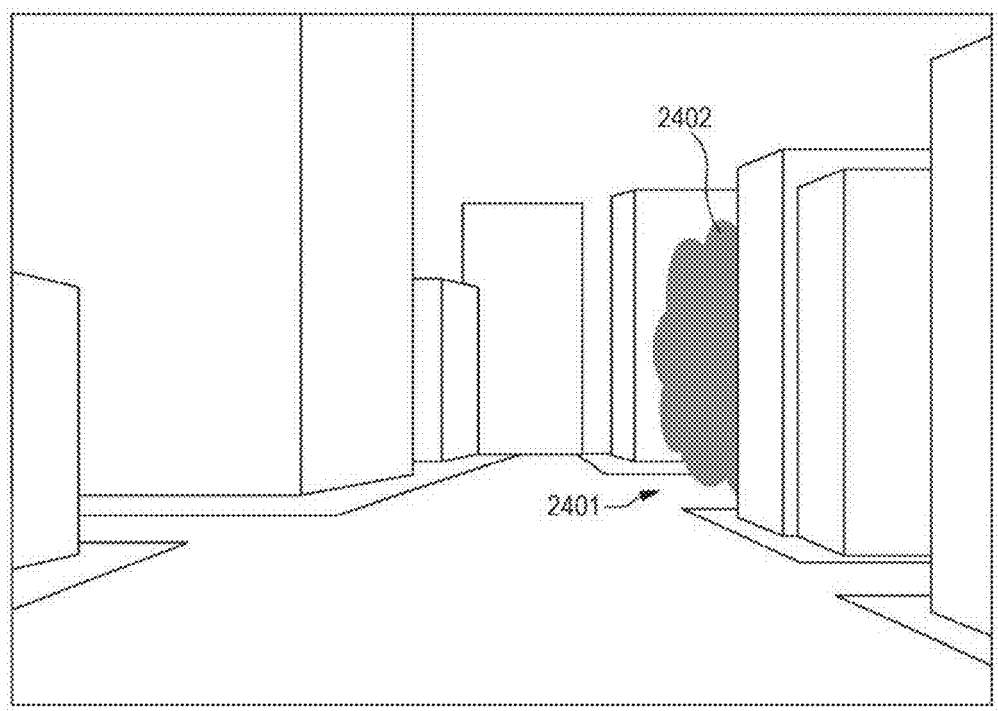
FIG. 24 is a diagram illustrating a display example of an image of a dangerous place on the information display device.

The example illustrated in FIG. 24 illustrates a fact that if a right turn is made at a street corner illustrated by reference numeral 2401, the user will find a dangerous place, which is illustrated by an object 2402 that blocks the road. If a danger category is an urgent case, such as a traffic accident, a fire, or the like, awareness of the user is promoted by displaying in a reddish color in order for the user to pay attention to pass through.

Figure 25:
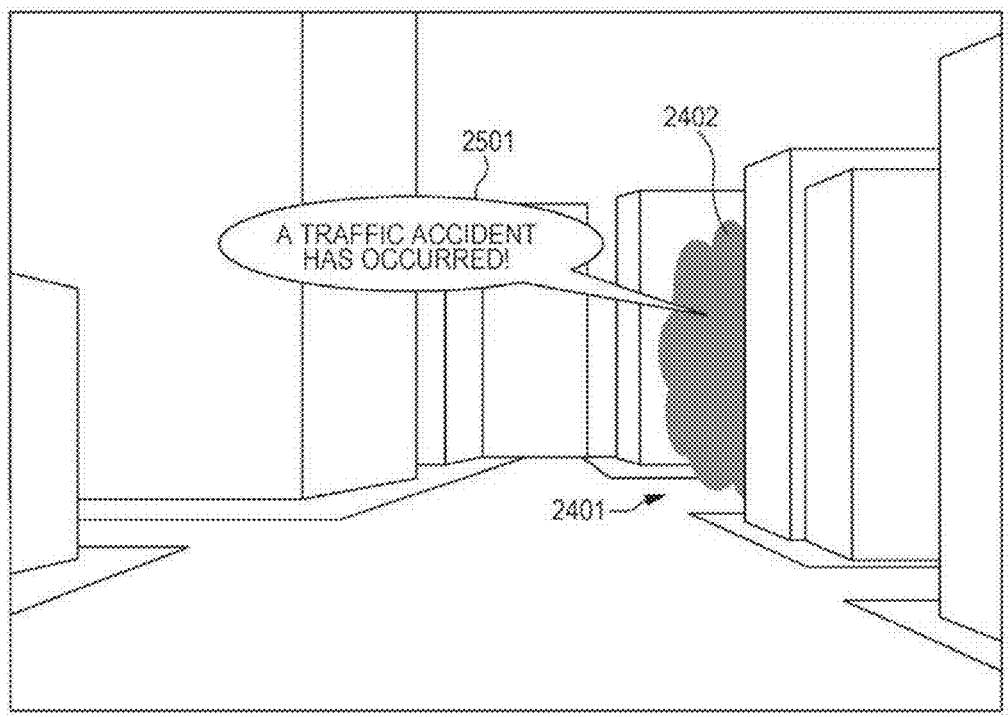
FIG. 25 is a diagram illustrating a display example of an image of a dangerous place on the information display device.

In the example illustrated in FIG. 25, a message stating "A traffic accident has occurred!" is further displayed as illustrated by reference numeral 2501 using a balloon in order to notify a danger category to the user. In this regard, an easy-to-understand sentence may be used for the message to meet the user's attribute information, such as the user's age, gender, and the like, for example (for example, if the user is a little child, or a lower-grade elementary school kids, Chinese characters are avoided, and sound message is used instead).

Figure 26:
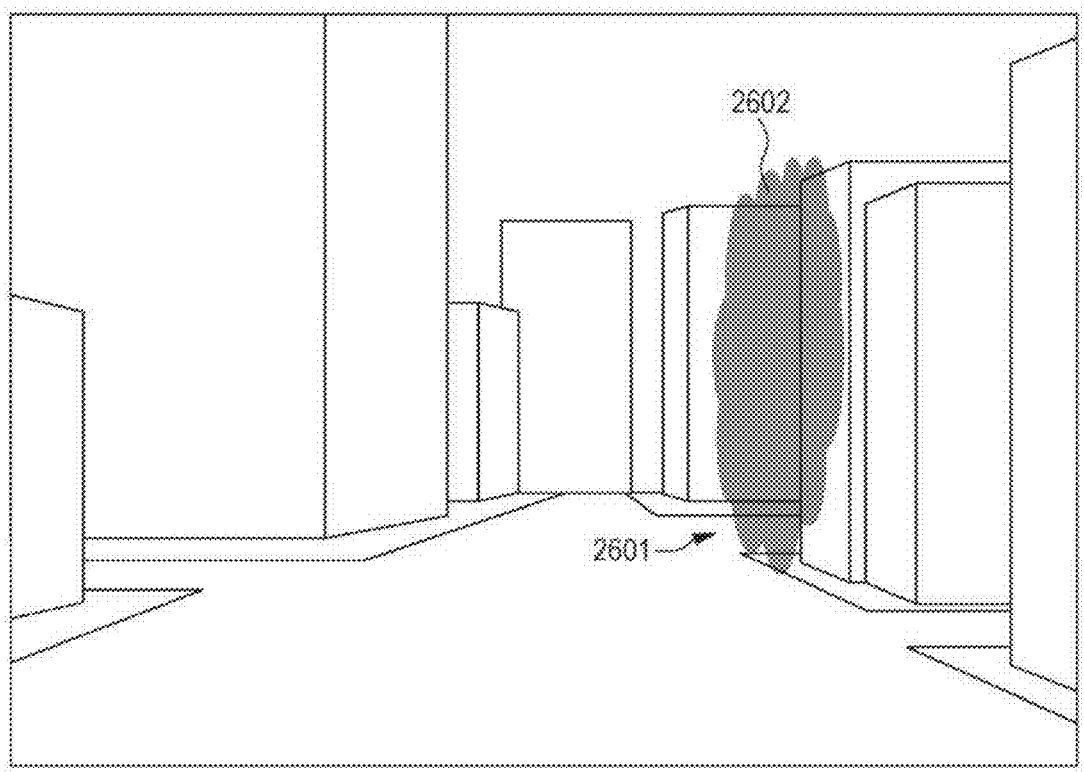
FIG. 26 is a diagram illustrating a display example of an image of a dangerous place on the information display device.

Also, the example illustrated in FIG. 26 illustrates a fact that if a right turn is made at a street corner illustrated by reference numeral 2601, the user will find a dangerous place, which is illustrated by an object 2602 that blocks the road. Unlike the example illustrated in FIG. 24, in the case of a dangerous place that is to be avoided to pass through in the first place, because if a right turn is made at a street corner 2601, a dangerous person to the user (for example, a suspicious person, a sex molester, a violent person, or a criminal) frequently appears, or the like, an object 2602 that covers the street corner 2601 itself with darkness to be unseen is displayed. Of course, in the same manner as the case illustrated in FIG. 25, a message indicating a danger category may be displayed together.

Figure 27:
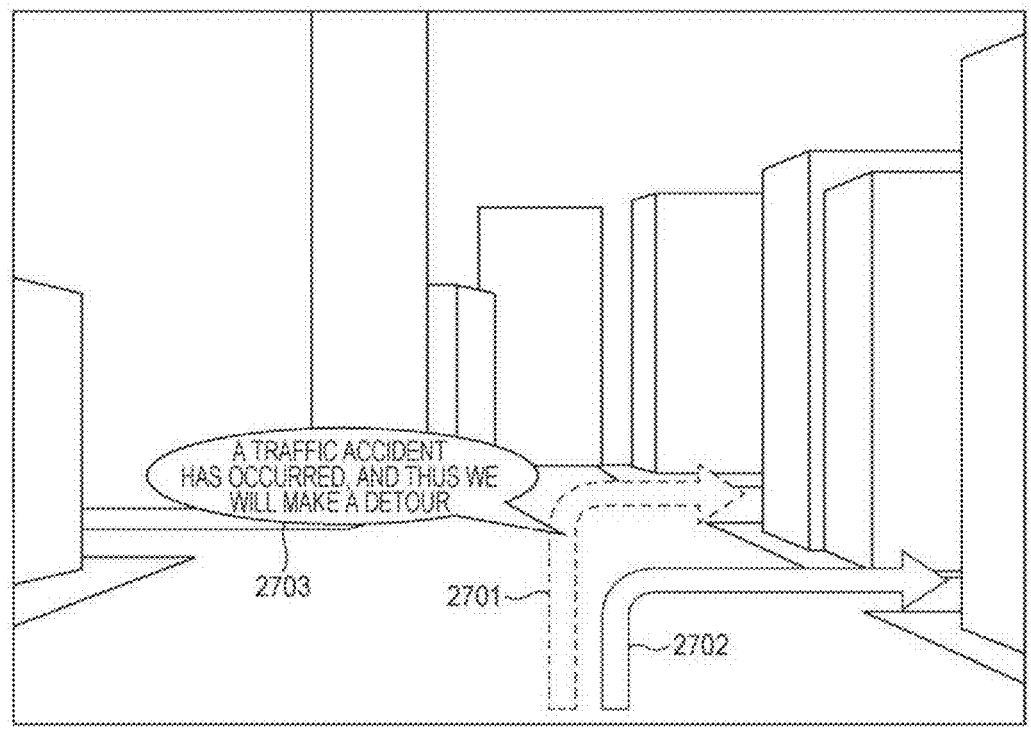
FIG. 27 is a diagram illustrating a display example of an image of a dangerous place on the information display device.

Also, FIG. 27 illustrates an example in which a display of a dangerous place is applied to a navigation system. In the example in FIG. 27, the original guidance is illustrated by a dashed-line arrow as illustrated by reference numeral 2701, and a guidance for avoiding the dangerous place is illustrated by a solid-line arrow as illustrated by reference numeral 2702. In order for the user not to be confused, the display of the original guidance 2701 may be omitted. Also, the original guidance may be given by displaying a message using a balloon 2703 stating the reason why reference numeral 2701 became difficult to pass.

As is understood from FIG. 24 to FIG. 27, with the techniques disclosed in this specification, it is possible to suitably provide an image of a dangerous place including a source of an accident, and an incident.

It is assumed that a plurality of images are hit regarding a dangerous place where the user of the information display device 130 is located. In the processing procedure illustrated in FIG. 21 or FIG. 22, it is assumed that filtering processing is performed in accordance with the time information and the user's personal attribute and behavioral attribute, and thereby images are narrowed down to a predetermined number of images (examples in which images are narrowed down to one image are illustrated in FIG. 24 to FIG. 27). However, it is also assumed that a plurality of images are hit on the same condition of the time information and the user's attribute information, and thus it is difficult to narrow down images to a predetermined number of images simply by the filtering processing. In such a case, a plurality of search conditions may be set in order to make a search, and images may be narrowed down to a predetermined number of images. In order to perform such narrow-down processing, three methods (A) to (C) are considered as follows.

(A) The information management center 120 narrows down the images using a default search condition.

(B) The images are narrowed down using a search condition specified by the information display device 130.

(C) The information display device 130 obtains necessary information from the information management center 120, and the images are narrowed down using a desired search condition.

Here, a description will be given of a scene in which the user of the information display device 130 is a young woman, and someone (a suspicious person) is chasing her as a specific example. She speculates as to how she can avoid a danger of being driven into a dead-end street, or a danger of being attacked on both sides by another accomplice. In such a case, the following pieces of information (a) and (b) are demanded.

(a) The best way to escape (a danger zone map within surrounding 1 km (a distance of 10-minute run))

(b) A face of an accomplice

As a search condition of an image in the case where a young woman becomes a user includes the following (1) to (4), for example.

(1) Dangerous images that were experienced by women aged within three years from the user (2) Images obtained within 30 minutes before and after the current time in the past two weeks (3) An image including a man rather than women (4) A maximum danger zone within surrounding 1 km (a distance of 10-minute run) (or a place of an actual crime)

The images that satisfies the above-described search conditions (1) to (4) are extracted for a predetermined number of pieces (for example, five pieces) in the order of descending degree of danger, and are presented to the user. Also, if the extracted number is less than the predetermined number of pieces, it is preferable for the information management center 120 to relax the search conditions (1) to (3) as a search condition (5) in order to adjust to the predetermined number of pieces (for example, expand the age width from within three years to within five years, expand the time from before and after 30 minutes from the current time to before and after one hour, expand a time period from the past two weeks to the past one month, and the like).

In the case of employing the above-described method (A), the information display device 130 whose user is a young woman transmits a request stating that she was chased and dangerous so that the information is to be transmitted. The information management center 120 narrows down the images using the above-described default search conditions (1) to (4) from the user's attribute information to a predetermined number of images, and transmits the predetermined number of images to the information display device 130. Also, the information management center 120 performs condition relaxation (5) as necessary.

Also, in the case of employing the above-described method (B), when the information display device 130 requests transmission of dangerous information, the information display device 130 specifies a desired search condition out of the default search conditions provided by the information management center 120. For example, if the search conditions (1) to (3) are specified, the information management center 120 searches for an image in that condition, and provides the result to the information display device 130. Alternatively, the information display device 130 may freely specify a search condition without being restricted by default search conditions. For example, the above-described search condition (3) may be replaced by (3)' two or more persons are included (In the case where an accomplice is female, and money and goods are forcefully demanded), and the search conditions (1), (2), (3)', (4), and (5) may be specified.

Also, in the case of employing the above-described method (C), the information display device 130 requests transmission of images satisfying the search conditions (1) and (2) from the information management center 120 in order to perform image search processing using all the search conditions (1) to (5). Then, the information display device 130 performs search processing on the images obtained from the information management center 120 to narrow down the images using the search conditions (3) to (5). In the case where the information display device 130 makes a search again by relaxing the search conditions (3) to (5), even if it becomes not possible to communicate with the information management center 120, it is possible to perform search processing. Also, if the communication line with the information management center 120 is narrow, there is an advantage in that the information display device 130 is capable of obtaining a search result quickly.

In the above, a detailed description has been given of the technique disclosed in this specification with reference to specific embodiments. However, it will be obvious to those skilled in the art that modifications and substitutions may be made without departing from the spirit and scope of the technique disclosed in this specification.

With the use of the technique disclosed in this specification for distribution of images of dangerous places, the following advantages (1) to (3) are obtained, for example.

(1) Quick Acquisition of Information on the Occurrence of Accident

To date, accident information has been broadcast by traffic information services. Also, a proposal has been made of a system for collecting images by a plurality of viewpoints at the time of the occurrence of a traffic accident (for example, refer to Japanese Unexamined Patent Application Publication No. 2012-98105). However, there is a delay from the occurrence of an accident to the arrival of information to each driver. Also, the target persons to whom the information is provided are limited to vehicle drivers, and it is not possible for the pedestrians, and the like to get the information. In contrast, by the technique disclosed in this specification, it is possible to transmit images captured not by in-vehicle cameras, but by viewpoints of various persons who encountered an accident or an incident, including pedestrians and drivers, to pedestrians and drivers who are approaching the occurrence site of the accident and the incident. Also it is possible to transmit information notifying a danger, such as images of an accident, an incident, and the like to those people in real time over a multifunctional information terminal, such as a head mounted display, a smart phone, or the like, or a head up display on a windshield. It is, therefore, possible to improve prevention efficiency of a second disaster and congestion.

(2) Prevention of Accidents

Even if a driver actually does not encounter an accident, there are minor incident operations having a high risk of causing an accident, such as an abrupt steering, a sudden braking, or the like (or prediction of the occurrence of an accident). Also, there are cases where although an accident has not actually occurred, or a pedestrian has not suffered an injury, a minor incident behavior occurs, such as a pedestrian stumbles on an obstacle or a hollow on the road, and the like. With the technique disclosed in this specification, it is possible for the head mounted display worn by a driver or a pedestrian, or the like to automatically detect a minor incident behavior on the basis of biological information, such as a pulse, perspiration, and the like, and transmits a captured image of such a dangerous place to the information management center. Thereby, it is possible to share minor incident information among the users in real time in order to prevent an accident.

(3) Creation of Hazard Map

With the technique disclosed in this specification, images of the dangerous places that were obtained from a plurality of image capturing devices are managed in database, and thus it is possible to create a hazard map of various accidents and incidents (injury, murder, theft, robbery, and the like) including traffic accidents, and to provide the hazard map to pedestrians and drivers in advance, or to give information and guidance in connection with real-time traveling or walking points. Thereby, it is possible to prevent the occurrence of various accidents and incidents. Also, it is possible to create and provide not only a hazard map of the accidents and incidents that actually happened, but also a latent hazard map indicating failed accidents or incidents. For example, it is possible to collect information of a dangerous place where an accident is likely to occur, such as a place where a vehicle driver or a pedestrian encountered a minor incident from a head mounted display worn by each driver or pedestrian.

With the technique disclosed in this specification, the captured images of a dangerous place and the accompanying information is collected in the information management center, and is managed in an image database. The image database has various applications including the following (1) to (4) in addition to above-described applications.

(1) Cause analysis of an accident and establishment of future countermeasures from the standpoint of a road constructor.

(2) Guidance on amendment of Road Traffic Law and enforcement method from the standpoints of Ministry of Land, Infrastructure, Transport and Tourism, and the police.

(3) Expediting arrest of criminals from the standpoints of the police.

(4) Prospect of improvement of precision and speedup of lawsuit decision such as indemnities, and gravity of punishments after an accident, and the like from the standpoints of Civil Procedure Law and Criminal Procedure Law.

Also, in the above, a description has been mainly given of the embodiments in which an information distribution system according to the technique disclosed in this specification distributes information regarding a dangerous place. However, it is thought that the system is operated by replacing a "dangerous place" with a "dangerous thing", such as a dangerous person, a dangerous animal, or the like. The dangerous person mentioned here includes an important dangerous person, such as a wanted criminal, and a fugitive, and also includes a relatively insignificant dangerous person who make a nuisance, such as a violent person, a smoker while walking, and the like. The dangerous animal includes a biting pet, and a highly poisonous animal. In addition, the dangerous thing includes flammable materials that are easy to catch fire, to explode, and the like. It is assumed that a dangerous thing changes positional information every moment unlike a dangerous place. Accordingly, the information management center may manage the image database in association with identification information based on a recognition result of the captured image, and the like in place of periodically updating positional information of the dangerous thing, or managing with the positional information.

In this regard, the image capturing device that provides an image of a dangerous place is basically an information device that is used by being worn by a user as a head mounted display. In the case of using a head mounted display, both a transmissive type and an immersion type may be used.

Also, the information display device on which information of a captured image of a dangerous place, and the like is displayed, which is distributed from the information management center, is basically moved with a user, but may be a smart phone, or a head up display in addition to a head mounted display.

In short, a description has been given of the technique disclosed in this specification by exemplification. However, the description of this specification should not be construed in a limited manner. In order to determine the gist of the technique disclosed in this specification, the appended claims should be considered.

In this regard, it is possible to configure the technique disclosed in this specification as follows.

(1) An image capturing device including:

a display section attached to a head or a face of a user, and configured to display an image;

a communication section configured to communicate with an external device;

an image capturing section;

a positional information acquisition section configured to acquire current positional information of the user; and a control section configured to capture an image of a dangerous place by the image capturing section in accordance with determination of a dangerous state, and transmit a captured image from the communication section to the external device together with the positional information acquired by the positional information acquisition section.

(2) The image capturing device according to (1), further including a state information acquisition section configured to acquire state information of the user, wherein the control section determines the dangerous state on the basis of the state information.

(3) The image capturing device according to (1), further including an environmental information acquisition section configured to acquire environmental information, wherein the control section determines the dangerous state on the basis of the environmental information.

(4) The image capturing device according to (1), wherein the control section transmits the captured image with information on image captured time.

(5) The image capturing device according to (1), wherein the control section transmits the captured image with information on attribute information of the user.

(6) The image capturing device according to (2), wherein the state information acquisition section acquires biological information of the user, and the control section determines the dangerous state by itself on the basis of the biological information, or acquires a determination result of a relative dangerous state determined by an external apparatus recording a large number of pieces of data.

(7) The image capturing device according to (6), wherein the control section determines the dangerous state on the basis of at least any one piece of biological information among a pulse of the user, perspiration, myoelectric potential, and movement of an eyeball.

(8) The image capturing device according to (6), wherein the control section determines the dangerous state further in consideration of whether the user is viewing a content using the display section.

(9) The image capturing device according to (8), further including an environmental information acquisition section configured to acquire environmental information, wherein the control section determines the dangerous state in consideration of the environmental information.

(10) The image capturing device according to (3) or (9), wherein the control section determines the dangerous state on the basis of an analysis result of ambient noises, winds, atmosphere (a thick fog or smoke, radioactive rays, or toxic chemical substance in an atmosphere), surrounding captured images as the environmental information.

(11) The image capturing device according to (6), further including a line of sight acquisition section configured to acquire a line of sight of the user, wherein the control section determines the dangerous state on the basis of biological information of the user when the line of sight falls on a place predicted to be dangerous.

(12) The image capturing device according to (11), further including an environmental information acquisition section configured to acquire environmental information, wherein the control section identifies the place predicted to be dangerous on the basis of the environmental information.

(13) The image capturing device according to (1), further including a line of sight acquisition section configured to acquire a line of sight of the user, wherein when the control section determines the dangerous state, the control section captures a still image or a moving image by the image capturing section in accordance with whether or not the line of sight remained for a certain time period.

(14) The image capturing device according to (13), wherein the control section stops capturing the image in accordance with a change in the line of sight while capturing the moving image.

(15) The image capturing device according to (1), further including a line of sight acquisition section configured to acquire a line of sight of the user, wherein the control section identifies the dangerous place, starts capturing a moving image in accordance with the line of sight falling on the dangerous place, and stops capturing the moving image in accordance with the line of sight falling off the dangerous place.

(16) The image capturing device according to (1), wherein the control section determines whether to capture a still image or a moving image in accordance with a level of importance of the dangerous place or a type of the dangerous place.

(17) A method of acquiring information, including:

determining a dangerous state on the basis of state information or environmental information of a user;

acquiring positional information in order to acquire current positional information of the user;

capturing an image of a dangerous place by an image capturing section in accordance with determination of the dangerous state; and transmitting a captured image from a communication section to an external device together with the positional information acquired by the acquiring positional information.

(18) An information distribution system including:

an image database configured to manage an image of a dangerous place together with positional information; and an information providing section configured to retrieve an image of a dangerous place corresponding to a current position of an information display device from the image database in order to provide the image.

(19) The information distribution system according to (18), wherein the images of the dangerous place collected from one or more image capturing devices are managed with individual pieces of positional information, respectively, in the image database.

(20) The information distribution system according to (19), wherein time information when the image of the dangerous place was captured by the image capturing device is managed in the image database in combination, and the information providing section retrieves an image of the dangerous place corresponding to the current position of the information display device from the image database by filtering with a current time.

(21) The information distribution system according to (19), further including a user database configured to manage attribute information of a user of each image capturing device, wherein the information providing section retrieves an image of the dangerous place corresponding to the current position of the information display device from the image database by filtering with attribute information of a user of an information display device of the providing destination in order to provide the image.

(22) The information distribution system according to (18), wherein the information providing section provides a hazard map created by mapping each dangerous place stored in the image database onto a map.

(23) The information distribution system according to (22), wherein the information providing section creates a hazard map for each danger category.

(24) The information distribution system according to (22), wherein the information providing section creates a hazard map for each user attribute.

(25) The information distribution system according to (18),
wherein when a plurality of images are retrieved for the current position of the information display device, the information providing section narrows down the images to a predetermined number of images using any one of the following methods,
(A) performing an image search using a default search condition,
(B) performing an image search using a search condition specified by an information display device, and
(C) transmitting necessary information to an information display device, and the information display device performing an image search using a desired search condition.

What is claimed is:

1. An image capturing device, comprising:
a display section that is one of head mountable or face mountable;
a communication section configured to communicate with an external device;
an image capturing section;
a positional information acquisition section configured to acquire user positional information;
a control section configured to:
control the image capturing section, based on a user state, to capture a first image of a place;
control the communication section to:
transmit the captured first image, first user attribute information, and the acquired user positional information, to the external device; and
receive a second image from the external device,
wherein the second image is generated, based on an image analysis operation on the transmitted captured first image and a comparison of second user attribute information with the first user attribute information,
wherein the second user attribute information represent attribute information for a plurality of users, and
wherein the second user attribute information stored in the external device.

2. The image capturing device according to claim 1, further comprising:
a state information acquisition section configured to acquire user biological information,
wherein the control section is further configured to control, based on the user state and the acquired user biological information, the image capturing section, to capture the first image of the place.

3. The image capturing device according to claim 1, further comprising:
a state information acquisition section configured to acquire user state information; and
an environmental information acquisition section configured to acquire environmental information,
wherein the control section is further configured to determine the user state, based on one of the acquired user state information or the acquired environmental information.

4. The image capturing device according to claim 1,
wherein the control section is further configured to transmit, to the external device, an image capture time of the captured first image along with the transmission of the captured first image, the first user attribute information, and the acquired user positional information to the external device.

5. The image capturing device according to claim 1,
wherein the control section is further configured to acquire a determination result of a relative user state determined by the external device.

6. The image capturing device according to claim 2,
wherein the control section is further configured to determine the user state, based on at least one piece of the user biological information that includes a user pulse, a user perspiration amount, a user myoelectric potential, or a user eyeball movement.

7. The image capturing device according to claim 1,
wherein the control section is further configured to determine the user state based on a user viewing status corresponding to content, and
wherein the content is displayed on the display section.

8. The image capturing device according to claim 3,
wherein the control section is further configured to determine the user state, based on an analysis result of one of ambient noises, winds, or the environmental information, and
wherein the environmental information corresponds to at least one of a thick fog in atmosphere, smoke in the atmosphere, radioactive rays in the atmosphere, or a toxic chemical substance in the atmosphere.

9. The image capturing device according to claim 2, further comprising:
a line of sight acquisition section configured to acquire a user line of sight,
wherein the control section is further configured to determine the user state, based on the user biological information and a prediction of a dangerous place which is in the user line of sight.

10. The image capturing device according to claim 9,
wherein the control section is further configured to predict the dangerous place based on environmental information.

11. The image capturing device according to claim 1, further comprising:
a line of sight acquisition section configured to acquire a user line of sight,
wherein the control section is further configured to capture one of a first still image or a first moving image by the image capturing section, based on the user state and a determination that the user line of sight is at a same place for a first time period.

12. The image capturing device according to claim 11,
wherein the control section is further configured to control, based on a change in the user line of sight, the capture of the first image.

13. The image capturing device according to claim 1, further comprising:
a line of sight acquisition section configured to acquire a user line of sight,
wherein the control section is further configured to:
identify the place as a dangerous place, based on the user state,
start the capture of a first moving image based on the user line of sight which falls on the identified dangerous place, and
stop the capture of the first moving image based on the user line of sight which falls off the identified dangerous place.

14. The image capturing device according to claim 1,
wherein the control section is further configured to capture one of a first still image or a first moving image, based on a level of importance of one of the place or a type of the place.

15. A method of acquiring information, comprising:
    determining a user state based on user state information;
    acquiring user positional information;
    capturing a first image of a place based on the determined user state;
    transmitting the captured first image, first user attribute information, and the acquired user positional information, to an external device; and
    receiving a second image from the external device,
        wherein the second image is generated, based on an image analysis operation on the transmitted captured first image and a comparison of second user attribute information with the first user attribute information, and
        wherein the second user attribute information represent attribute information for a plurality of users, and
        wherein the second attribute information is stored in the external device.

16. A non-transitory computer-readable medium having stored thereon, computer-executable instructions which, when executed by a processor, cause a computer to execute operations, the operations comprising:
    determining a user state based on user state information;
    acquiring user positional information;
    capturing a first image of a place based on the determined user state;
    transmitting, the captured first image, first user attribute information, and the acquired user positional information to an external device; and
    receiving a second image from the external device,
        wherein the second image is generated, based on an image analysis operation on the transmitted captured first image and a comparison of second user attribute information with the first user attribute information, and
        wherein the second user attribute information represent attribute information for a plurality of users, and
        wherein the second user attribute information is stored in the external device.

* * * * *